United States Patent
Shaw et al.

(10) Patent No.: US 9,244,862 B2
(45) Date of Patent: Jan. 26, 2016

(54) SECURE STORAGE DEVICE PERMANENTLY DISABLED BY REMOTE COMMAND

(71) Applicant: ExactTrak Limited, Banbury (GB)

(72) Inventors: Norman Shaw, Wallingford (GB); John Pragnell, Brackley (GB)

(73) Assignee: ExactTrak Limited, Banbury, Oxfordshire (GB)

( * ) Notice: Subject to any disclaimer, the term of this patent is extended or adjusted under 35 U.S.C. 154(b) by 0 days.

(21) Appl. No.: 13/934,336

(22) Filed: Jul. 3, 2013

(65) Prior Publication Data

US 2013/0311737 A1  Nov. 21, 2013

Related U.S. Application Data

(63) Continuation of application No. 12/951,437, filed on Nov. 22, 2010, now abandoned, which is a continuation of application No. PCT/GB2009/050571, filed on May 26, 2009.

(30) Foreign Application Priority Data

| May 23, 2008 | (GB) | 0809414.6 |
| Oct. 17, 2008 | (GB) | 0819089.4 |
| Mar. 10, 2009 | (GB) | 0905405.7 |

(51) Int. Cl.
*G06F 1/00* (2006.01)
*G06F 12/14* (2006.01)
(Continued)

(52) U.S. Cl.
CPC .............. *G06F 12/14* (2013.01); *G06F 21/305* (2013.01); *G06F 21/34* (2013.01); *G06F 21/78* (2013.01); *G06F 21/88* (2013.01);

(Continued)

(58) Field of Classification Search
USPC .......................................................... 713/323
See application file for complete search history.

(56) References Cited

U.S. PATENT DOCUMENTS 5,652,892 A   7/1997  Ugajin
5,748,084 A   5/1998  Isikoff
(Continued)

FOREIGN PATENT DOCUMENTS

CN  20071027753 A  *  4/2007  .............. G06F 21/00
CN     101295334 A     10/2008
(Continued)

OTHER PUBLICATIONS

Wikipidia defination of "signal" pp. 1-2.*

*Primary Examiner* — Mohammed Rehman
(74) *Attorney, Agent, or Firm* — Woodard, Emhardt, Moriarty, McNett & Henry LLP

(57) ABSTRACT

A communication and security device for a portable computer is disclosed including a housing, a connector provided on the housing for physical connection to the portable computer, a computer interface coupled to the connector for communicating data with the portable computer, a wireless modem coupled to the computer interface for communicating data between the portable computer and a remote device via a wireless network, a regulator operable to regulate power in the communication and storage device, and a processor coupled to control the regulator, the processor coupled to the wireless modem and arranged to process at least one security command received by the wireless modem to control the regulator in response to the received command.

19 Claims, 12 Drawing Sheets

(51) Int. Cl.
*G06F 21/30* (2013.01)
*G06F 21/34* (2013.01)
*G06F 21/78* (2013.01)
*G06F 21/88* (2013.01)

(52) U.S. Cl.
CPC ............... *G06F 2221/2101* (2013.01); *G06F 2221/2111* (2013.01); *G06F 2221/2143* (2013.01)

(56) References Cited

U.S. PATENT DOCUMENTS

| | | | |
|---|---|---|---|
| 6,915,142 B1 | 7/2005 | Wietfeldt | |
| 7,336,095 B2 * | 2/2008 | Erickson et al. | 326/8 |
| 8,041,330 B1 | 10/2011 | Garin | |
| 2003/0105971 A1 | 6/2003 | Angelo et al. | |
| 2003/0190927 A1 | 10/2003 | Leong | |
| 2004/0157630 A1 | 8/2004 | Monroe | |
| 2004/0203567 A1 | 10/2004 | Berger | |
| 2005/0010796 A1 | 1/2005 | Arnouse | |
| 2005/0253714 A1 | 11/2005 | Stephens | |
| 2007/0030972 A1 | 2/2007 | Glick et al. | |
| 2007/0090804 A1 | 4/2007 | Kim et al. | |
| 2007/0157019 A1 * | 7/2007 | York | 713/155 |
| 2008/0028477 A1 * | 1/2008 | Lehmann | G06K 19/0702 726/36 |
| 2008/0065905 A1 | 3/2008 | Salessi | |
| 2008/0143373 A1 * | 6/2008 | Bonaccio et al. | 326/8 |
| 2008/0182592 A1 * | 7/2008 | Cha et al. | 455/456.3 |
| 2008/0184349 A1 * | 7/2008 | Ting | 726/7 |
| 2009/0065761 A1 * | 3/2009 | Chen et al. | 257/5 |
| 2010/0140683 A1 * | 6/2010 | Miyazaki et al. | 257/324 |

FOREIGN PATENT DOCUMENTS

| | | |
|---|---|---|
| EP | 1914956 A1 | 4/2006 |
| EP | 1 895 750 A1 | 3/2008 |
| EP | 2051475 A2 | 4/2009 |
| GB | 2398445 A | 8/2004 |
| WO | WO 00/43855 | 7/2000 |
| WO | WO 2007/063437 A1 | 6/2007 |
| WO | WO 2007/149977 A1 | 12/2007 |
| WO | WO 2008/060920 A2 | 5/2008 |

* cited by examiner

SECURE STORAGE DEVICE PERMANENTLY DISABLED BY REMOTE COMMAND

CROSS-REFERENCE TO RELATED APPLICATION

This application is a continuation of U.S. patent application Ser. No. 12/951,437 filed Nov. 22, 2010, which is a continuation of International Application No. PCT/GB2009/050571, filed May 26, 2009, which claims the benefit of Great Britain Application Nos. GB 0809414.6, filed May 23, 2008; GB 0819089.4, filed Oct. 17, 2008; and GB 0905405.7, filed Mar. 30, 2009, the entire disclosures of which are hereby incorporated by reference.

BACKGROUND OF THE INVENTION

This invention relates to security provision and data audit monitoring for portable computers and for portable memory storage devices, in particular for solid state memory storage devices.

Laptop computers and removable memory devices having small physical size and significant data storage capacity are increasingly common. Loss or theft of such a device presents a considerable data security hazard, in addition, if devices are unattended for any time there is a risk that unauthorised access to data may occur without the knowledge of the data owner.

As a result of their small physical size laptop computers and removable memory devices may easily be misplaced or stolen. In recent and highly publicised examples the loss of highly sensitive or valuable information on removable memory storage devices has been shown to be damaging both to organisations and to governments.

It is desirable to provide the highest levels of security when removable memory is connected to a host computer and also during transportation. It is further desirable to provide an audit trail of where, when and by whom data has been read, viewed, copied or modified, it is further desirable that this information be held securely and be independently verifiable and safe from tampering. This would provide assurance that the highest levels of data security have been maintained and would provide valuable information as to exactly what information has been read or released by authorised and unauthorised users.

STATEMENTS OF INVENTION

Aspects and embodiments of the invention are specified in the claims.

Examples of the invention provide methods, apparatus and systems for providing data security and for maintaining a secure record of when, where and by whom protected data has been read, copied or altered.

In one possibility a system includes a security and communications device comprising verification means for verifying a computer to which it is connected and for verifying the identity of the user of that computer and a wide area communication means for reporting verification information to a remote monitoring station. A security and communications device can be configured to provide verification information to the computer only in the event that one or more security conditions are met. A security and communications device includes location determining means, for example GPS and/or cellular based location determining means. Examples of security conditions include: establishing communication with a monitoring station via the wide area communications device; and receiving security information from a remote monitoring station; and performing a secure handshake procedure with a remote monitoring station via the wide area communications device; and transmitting time and location information to a remote monitoring station; and determining that the device is in an authorised location; and transmitting determined location information to a remote monitoring station and receiving a verified response, for example a verified response may include authorisation to operate the device in that location.

Advantageously security software is provided such that operation of a computer is inhibited or prevented when a verified security and communications device is not connected to the computer or when a security and communications device does not provide verification information.

In an example there is provided a data storage device having a housing and an interface for connecting the data storage device to a host device, the data storage device comprising: location determining means, data storage means, an encryption processor, and a controller, wherein the encryption processor is coupled to the interface and to the data storage means and is operable, under control of the controller, to perform encryption operations on data communicated between the interface and the data storage means; and the controller is coupled to the location determining means and comprises a non-volatile memory for storage of permitted location information.

In an example there is provided a data storage device wherein the controller is operable to compare current location information with permitted location information to determine whether the current location corresponds to a permitted location.

In an example there is provided a data storage device wherein the controller is operable to inhibit the encryption processor from performing encryption operations.

In an example of the invention there is provided a data storage device having energy storage means operable to provide power to components of the data storage device.

In an example of the invention the energy storage means is operable to store energy derived from a host device attached to the interface.

In an example there is provided a data storage device wherein inhibiting encryption operations includes at least one of withholding an encryption key, deleting an encryption key, modifying an encryption algorithm, deleting an encryption algorithm, withholding an encryption enabling flag.

In an example there is provided a secure data storage device having a housing and an interface for connecting the data storage device to a host device, the data storage device comprising: data storage means, communication means, an encryption processor for performing encryption operations on information passed between the data storage means and the host device, and a controller, wherein the controller is operable to disable the encryption processor. In an example of the controller is operable to disable the encryption processor in the event that the data storage device is disconnected from a host device.

In an example the communication means is operable to send and receive controller operation commands. For example controller operation commands may be commands to enable the encryption processor, to disable the encryption processor, to delete data from the data storage means, to report the MAC address of the host device, to report host device information, for example a MAC address of a host device.

In an example a secure data storage device comprising a housing and an interface for connecting the data storage device to a host device, the data storage device comprising: data storage means, communication means, an encryption processor for performing encryption operations on information passed between the data storage means and the host device, and a controller, wherein the controller comprises a volatile memory for the storage of encryption key information and wherein the controller is operable to provide encryption key information to the encryption processor and to overwrite encryption key information.

In an example there is provided a secure data storage device wherein encryption key information is not stored in the encryption processor.

In an example there is provided a secure data storage device wherein the controller is configured to overwrite encryption key information stored in the volatile memory in response to at least one of: removal of the data storage device from a host device, receiving a secure command from a remote device, not receiving a secure command from a remote device for a more than a specified interval, a command issued by a user of the device.

An example provides a communication and security device for a portable computer comprising: a housing; a connector provided on the housing for physical connection to the portable computer; a computer interface coupled to the connector for communicating data with the portable computer; a wireless modem coupled to the computer interface for communicating data between the portable computer and a remote device via a wireless network; a processor coupled to the wireless modem arranged to process at least one security command received by the wireless modem and to perform at least one security function in response to the received security command.

In an example a communication and security device has a radio frequency homing beacon, wherein the homing beacon is arranged to be activated by the processor in response to a remote command received by the wireless modem. In an example a communication and security device has a location determining device, preferably a GPS device.

A second example provides a communication and security device for a portable computer comprising: a housing; a connector provided on the housing for physical connection to the portable computer; a computer interface coupled to the connector for communicating data with the portable computer; a wireless modem coupled to the computer interface for communicating data between the portable computer and a remote device via a wireless network; a processor coupled to the wireless modem arranged to process at least one security command received by the wireless modem; a radio frequency homing beacon, wherein the homing beacon is arranged to be activated by the processor in response to a remote command received by the wireless modem.

Another example provides a communication and security device integrated with a motherboard of a portable computer, the device comprising: a wireless modem for communicating data between the device and a remote device via a wireless network; a processor, separate from a processor of the motherboard and coupled to the wireless modem wherein the processor is arranged to process at least one security command received by the wireless modem; a power supply separate from a power supply of a portable computer so that the device may be operated whether the host computer is turned on or off. In one possibility a communication and security device integrated with a motherboard of a portable computer has a location determining device, preferably a GPS unit. In one possibility a communication and security device integrated with a motherboard of a portable computer has a radio frequency homing device.

A wireless modem may be a cellular modem, for example a 3G modem, GSM, GPRS or the like. Alternatively, it may comprise a wifi communication device, for example a 802.11 standard modem. Additionally it may comprise an 802.16-2004 standard fixed WIMAX device often called 802.16d, further additionally it may comprise an 802.16e-2005 standard device often referred to in shortened form as 802.16e.

In examples a communication and security device having a processor, a GPS unit, an independent power supply and a wireless modem, which device functions substantially as an ordinary wireless modem. Substantially all of the wireless communication bandwidth available to a security device may be given over to wireless communication of a host device. Preferably, substantially all of the bandwidth may comprise at least 90% of the bandwidth.

An example provides a security device for a personal computer having a cellular modem and a GPS unit. The cellular modem may report the location of the unit in response to a received command. In an example a security device for a personal computer may have an independent power source so that it may operate regardless of a host device being switched on or off.

A further example provides a security device for a personal computer having a cellular modem, a battery, an encryption key store and software for the personal computer. Advantageously the software encrypts data held on the personal computer with an encryption key held in the encryption key store and the security device may delete the encryption key in response to a command received via the cellular modem.

In an example command messages for the cellular modem may be queued remotely for collection by the security device.

One example has a microprocessor operable to interrogate and operate each of a set of tracking components to select the most appropriate component in a hierarchical order.

In a further example the microprocessor is operable to accept instructions from a remote monitoring centre. These instructions will enable the microprocessor to control the tracking components in specific ways and also operate key components of the host system when it is in operation.

In another example a microprocessor regulates a supply of power to the tracking components so as to conserve power and prolong independent operation. A device may include an internal power source for powering the device independently of a portable computer and may be arranged to recharge the internal power source when the portable computer is powered up. Preferably the internal power source is sized to power the device for at least 48 hours still more preferably the device may be arranged to receive security commands when the portable computer is powered down and to trigger the security feature when the portable computer is next powered up.

In one possibility a device is arranged to perform a security function in response to detection of tampering or disconnection of the device from the portable computer. Optionally a wireless modem is a cellular modem and an interface is a PCMCIA interface or any derivative thereof.

In an example a security device is provided with software for the host device, once installed this software encrypts all data held on the host device using an encryption key held only in an encryption key store of the security device. This renders all data stored on the host device unreadable without the security device being in place.

In one possibility a security device has a biometric identification module, such as a finger print reader to allow a host device access to an encryption key.

In another possibility a security device may be put into a locked state where an encryption key is not supplied to a host device, optionally this locked state may be activated in response to a received command or when the device enters a protected operation mode. Optionally an encryption key may be deleted or overwritten in response to a received command or when the device enters a protected operation mode. Optionally in a locked state power to the data storage means is switched off.

A security device may be provided with tamper protection for an encryption key store wherein breaking a tamper detection causes an encryption key to be deleted or overwritten. Optionally a tamper detection system for a security device may be operable to cause a host device to delete data.

Examples are provided with one or more communication systems which may be operable to pass information between a base station and the control unit. Communication systems may comprise one or more systems chosen from the following list: a GSM receiver and transmitter for voice, message, and data communication; a radio frequency transceiver; a cellular modem.

In a security device any of the communication systems may be used to control the security device remotely.

In an example a security device can be put into a protected state by a remote command. Optionally a security device may default into a protected state after a given interval during which a remote command is not received.

It is also desirable to provide an integrated tracking solution that is capable of reporting its location using a combination of technologies. These technologies may include GPS, GSM, RF and the Internet.

A possible tracking solution might provide a tracking solution capable of reporting its precise position regardless of a host device being turned on or off.

In an example a security device is provided with a battery and a power regulator which regulates power to the processor, the communication systems, and the GPS unit, wherein a component may be provided with power dependent on one or more connectability parameters.

An alternative solution would be to provide a tracking solution which will independently seek the most appropriate tracking technology to use and report its position depending upon what signal sources and information are available at any given time or location.

A tracking solution may report its position directly and securely to a nominated monitoring centre via encrypted communication using the chosen component In an aspect there is provided a computer security system comprising a security and communications device connectable to a computer to be secured and security software operable by the computer to be secured, the security and communications device comprising: a housing; a data store; a wide area communications device; and a connector for connection to the computer; and, a controller configured to control access to the data store and to control the wide area communication device to transmit a security message to a remote monitoring system in response to an access event affecting the computer to which the security and communications device is connected; the security software being configured to control a computer to verify the presence of the security and communications device and, in the event that the presence of the security and communications device cannot be verified, to inhibit operation of the computer. Optionally the access event is one of: powering up of the computer; an attempt to power up the computer; reading data from the security and communications device; deleting data from the security and communications device; and, writing data to the security and communications device. In an example the security software is configured to receive verification information from the security and communications device in order to verify the presence of the security and communications device.

In an example the security software is configured to poll the security and communications device for verification information in order to verify the presence of the security and communications device.

In an example the controller is arranged to provide verification information to a computer to which the device is connected on the condition that a security condition has been met. In an example the security condition is that the security message has been transmitted to a remote monitoring system. In an example the security condition is that that a verified response has been received to the transmitted security message. In an example the security condition is that a secure handshake procedure has been completed.

In an example the security and communications device includes a location determiner. Preferably a location determiner includes at least one of a GPS system and a GSM based location measurement system. In an example the transmitted security message includes determined location information.

In an example there is provided a computer security system wherein the security and communications device is configured to receive a response to the transmitted security message which includes authorised location information, and wherein the security and communications device is configured to inhibit operation of the host computer in the event that a determined location is not an authorised location.

In an example there is provided a computer security system wherein the security and communications device is configured to receive at least one security command in response to the transmitted security message for example wherein the security and communications device includes a non-volatile memory storing security command instructions and wherein the received security command includes a reference to a memory address of at least one security command instruction.

In an example there is provided a computer security system wherein the security software comprises software compatible with one of: a windows operating system; a linux operating system; and; a Macintosh operating system; for example wherein the security software comprises a modification or patch for one of: a windows operating system; a linux operating system; and; a Macintosh operating system.

In an example there is provided a secure computer system comprising: a computer security system according to any preceding claim and said computer having the security and communications device connected thereto and the security software installed thereon. In an example the monitoring system is operable to receive and record transmitted security messages and to transmit a secure response.

In an example a secure response includes at least one data access control command configured to cause a security and communications device to permit or inhibit an operation of a host computer. In an example a secure response includes at least one data access control command configured to cause a security and communications device to permit or inhibit an operation of the security and communications device. In an example a secure response includes a reference to a memory address of the security and communications device. In an example there is provided a computer program product including security software for use in a computer security systems described herein.

In an example a data access control device comprises a housing, a data store, a wide area communications device and a connector for connection to a host device; and, a controller configured to control access to the data store and to control the wide area communication device to transmit a message comprising verification information in response to an attempt to retrieve data from the data store.

In an example the controller is configured to restrict access to the data store until a security message is received in response to the message.

In an example in the event no communication can be established with a monitoring status the controller is configured to at least one of: restrict access to said data store to particular times of day; inhibit operation of a host device to which the device is connected to particular times of day.

Where a data access control device comprises a non-volatile memory storing authorised location information optionally, in the event no communication can be established with a monitoring station, the controller is configured to control the location determining means to determine the current location and to compare the determined location with the authorised location information.

In the event that a determined location is not an authorised location, the controller can be configured to at least one of: inhibit an operation of a host device; restrict access to said data store; and delete data from said data store.

In an example a transmitted message comprises location information.

A data access control system comprises secure data storage devices and means described herein and a monitoring station configured to receive the transmitted message and, in the event a security condition is met, to send a response message to the data access control device said response message comprising verification information. Optionally a monitoring station records data audit information received from the transmitted message.

Also described herein is a computer program product for use with a computer security system, said product comprising a secure application operable to display and modify secure data stored on the data store of the security and communications device.

Also described herein is a computer program product for use with a computer security system wherein said computer program product is a windows service which loads as part of a boot sequence of the operating system. A computer program includes an application virtualisation platform which encapsulates the secure application from the operating system of said computer.

Also described herein is a monitoring station comprising a controller, a wide area communication means and a data store, said controller being operable to control the wide area communication means to communicate with a plurality of computer security systems or secure data storage devices.

In an example a communication and security device for a portable computer comprises: a housing; a connector provided on the housing for physical connection to the portable computer; a computer interface coupled to the connector for communicating data with the portable computer; a wireless modem coupled to the computer interface for communicating data between the portable computer and a remote device via a wireless network; a processor coupled to the wireless modem arranged to process at least one security command received by the wireless modem; a radio frequency homing beacon, wherein the homing beacon is arranged to be activated by the processor in response to a remote command received by the wireless modem.

In another example a communication and security device integrated with a motherboard of a portable computer comprises: a wireless modem for communicating data between the device and a remote device via a wireless network; a processor, separate from a processor of the motherboard and coupled to the wireless modem wherein the processor is arranged to process at least one security command received by the wireless modem; a power supply separate from a power supply of a portable computer so that the device may be operated whether the host computer is turned on or off.

In an example a communication and security device integrated with a motherboard of a portable computer comprises a location determining device, preferably a GPS device.

In an example of a communication and security device integrated with a motherboard of a portable computer a wireless modem may be a cellular modem having a GSM capability.

In an example of a communication and security device integrated with a motherboard of a portable computer a wireless modem of the device provides to a host device functionality substantially corresponding to an ordinary wireless modem. Preferably substantially all of the wireless communication bandwidth available to a security device may be given over to wireless communication of a host device, for example at least 90% of the bandwidth.

In an example of a communication and security device integrated with a motherboard of a portable computer the wireless modem is operable to report the location of the unit in response to a received command.

In an example of a communication and security device integrated with a motherboard of a portable computer the device is operable to modify the operation of a host device.

In an example of a communication and security device integrated with a motherboard of a portable computer the operation of the host device is modified to cause a boot up sequence of a host device to be suspended if a communication channel of a communication and security device is not available.

In an example of a communication and security device integrated with a motherboard of a portable computer the host device is modified to pass control of the host device to a communication and security device during a boot up sequence.

In an example of a communication and security device integrated with a motherboard of a portable computer the device is operable to modify operation of a host device to prevent a host device from accessing a data store of the host device.

In an example of a communication and security device integrated with a motherboard of a portable computer the device is operable to change a password of the BIOS of a host device.

Also described herein is a method of protecting a portable computer device, the method comprising: providing a communication and security device, the device comprising: a computer interface for communicating data with the portable computer; a wireless modem coupled to the computer interface for communicating data between the portable computer and a remote device via a wireless network; a processor coupled to the wireless modem arranged to process at least one security command received by the wireless modem and to perform at least one security function in response to the received security command; and configuring a portable computer to operate only when connected to the communication and security device.

Preferably a communications and security device is provided in a housing and has a connector provided on the housing for physical connection to the portable computer wherein the connector is coupled to the computer interface.

In one possibility a communications and security device is incorporated in a component of a portable computer, preferably a motherboard of a portable computer.

Configuring a portable computer may comprise modifying the BIOS or providing additional low level drivers. A wireless modem can have a GSM capability operable to provide a communication channel between the processor and a remote device for example by receiving a security command in the form of an SMS message preferably wherein an SMS message is encrypted.

A communication channel may be protected by filtering, preferably wherein filtering comprises filtering SMS messages based on sender information. The communication channel may be used for sending location information from the security and communications device, preferably GPS location information, to a remote device. Optionally location information is sent in response to receiving a message, preferably wherein a message is an encrypted SMS message. Optionally a received message can contain a reference to a memory address of a security device wherein a memory address of a security device corresponds to a memory address of one or more preconfigured instructions. Such preconfigured instruction may comprise instructions for a communications and security device to perform one or more of action chosen from a list comprising: deleting a directory structure of a data store of a host device; deleting data of a data store of a host device; modifying data of a data store of a host device; overwriting data of a data store of a host device; deleting nominated data of a data store of a host device; overwriting nominated data of a data store of a host device; transmitting recently recorded data of a data store of a host device; transmitting nominated data of a data store of a host device; transmitting location information; connecting to the internet using a wireless modem of a communications and security device; modifying a BIOS of a host device; changing a password of a BIOS of a host device. A computer program product comprising instructions to perform any of the foregoing methods may be provided.

In one possibility a communications and security device for a portable computer comprises:
a wireless modem operable substantially as a wireless modem of a portable computer wherein a wireless modem has a GSM capability; a processor operable to control the wireless modem independently of the portable computer; a battery operable to supply power to the communications and security device; and a power management unit operable to adjust operation of components of a communications and security device. Optionally a power management unit is operable to adjust the operation of components in response to power availability constraints for example by adjusting the operation of components of the device in response to a received command, preferably wherein a received command is sent by a remote device. In some examples a power management unit is operable to override a received command in response to a power availability constraint. Optionally a GPS unit may be activated by the processor in response to a command received by the processor. The device may comprise a radio frequency homing device which may be activated by the processor in response to a command received by the processor. Optionally a command may be received in an SMS message, preferably an encrypted SMS message and the device may be arranged to conform to a PC-Xpress form factor.

Examples also provide a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

Examples also provide a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

Examples also provide methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa. Features of aspects of the invention, embodiments, examples and possibilities are illustrative and appropriate combinations of their features may be made to provide solutions to the problem of data security described herein.

Furthermore, features implemented in hardware may generally be implemented in software, and vice versa. Any reference to software and hardware features herein should be construed accordingly.

BRIEF SUMMARY

A communication and security device for a portable computer is disclosed including a housing, a connector provided on the housing for physical connection to the portable computer, a computer interface coupled to the connector for communicating data with the portable computer, a wireless modem coupled to the computer interface for communicating data between the portable computer and a remote device via a wireless network, a regulator operable to regulate power in the communication and storage device, and a processor coupled to control the regulator, the processor coupled to the wireless modem and arranged to process at least one security command received by the wireless modem to control the regulator in response to the received command.

One object of the present disclosure is to describe an improved communication and security device for a portable computer.

BRIEF DESCRIPTION OF THE SEVERAL VIEWS OF THE DRAWINGS

Embodiments of the invention will now be described with reference to the accompanying drawings, in which.

DETAILED DESCRIPTION

Figure 1A:
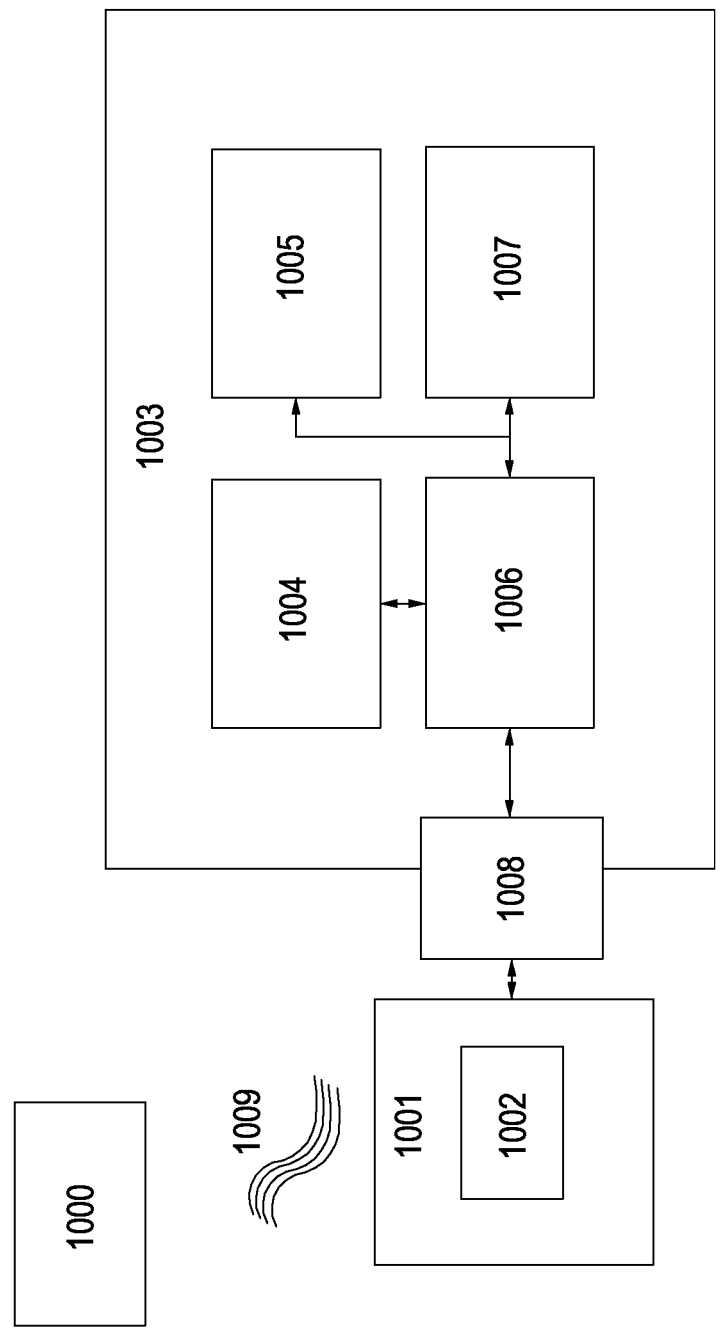
FIG. 1a shows a security and communications device and system.

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

Referring now to FIG. 1a a security and communications device 1003 has a housing 1010 and an interface 1008 for connection of the device 1003 to a host computer 1001. Coupled to the interface is a controller 1006 which is connected to a data store 1007, and to a security element 1004 which element comprises a wide area communications device for communication over a wide area communications network 1009, for example a GSM or GPRS network.

A computer security system includes a security and communications device 1003 and security software 1002. In an example the security software 1002 is windows based software which controls the boot sequence or start up procedure of a computer 1001. The security software 1002 can be configured to verify the presence of a security and communications device 1003. In one possibility the security software 1002 can be arranged to inhibit operation of the computer 1001 in the event that a verified security and communications device 1003 is not connected to the computer 1001. The controller 1006 of the security and communications device 1003 and the computer can perform a secure handshake wherein the computer provides identification information and in response the security and communications 1003 device provides a secure response.

The security and communications device 1003 can be configured only to operate with a certain computer, or with a restricted group of computers and to identify those computers using predetermined verification information, for example a unique identifier or passkey held in the security software 1002. Preferably the security software 1002 includes means for verifying the identity of a user, for example password protection or by means of biometric security measures such as fingerprint recognition or iris recognition apparatus. In these examples the security and communications device can be configured to operate only with a certain computer when it is being operated by a certain verified user, or with certain groups of computers when they are being operated by a particular user or only with a particular computer when it is being operated by one of a predetermined group of users. In examples of the invention verification information includes information about the identity of the user of a computer to which the device 1003 is connected.

Verifying the presence of the security and communications device may include receiving verification information provided by the security and communications device. Verification information may be provided by the security and communications device once a security message has been transmitted, for example to a remote monitoring station 1000.

In one possibility a remote monitoring station may respond to a received security message by sending status and security information. In examples the security and communication device may provide verification information to a host computer 1001 only once status and security information has been received from a remote monitoring station 1000.

In examples the security element 1004 of the security and communications device includes location determining means, for example a GPS module or, in other examples a GSM based location determining means. In these examples transmitted messages include location information and verification information passed between the security and communications device and the host computer may include location information.

In examples the computer security system is configured to transmit regular security messages when a computer is in use. Transmitted information includes at least one of location information, time and date information, user identification information, host computer information, data access information, and other information. Data access information can include information about data that has been accessed on the host computer or data that has been accessed on the data store of the security and communications device. Data access information may include data that has been written to the host computer or to the data store of the security and communications device. Data access information may include data that has been copied from the host computer or from the data store of the security and communications device.

A remote monitoring station is configured to send and receive verification information from security and communication devices and preferably to record that information. In one possibility the remote monitoring station may record all verification information to create a record of where and when the security and communications device was used and by whom. In this manner an accurate record of data access operations can be maintained and the security of data can be closely monitored. In addition recording information about data operations enables a remote back up to be assembled and for an authorised user to determine the content of the data store of a security and communications device. In this manner data security is assured and, in the event that a security and communications device is lost or misplaced the owner or owners of the data can know if, and if so where and when anyone has read copied or accessed their data or attempted to do so.

In a preferable embodiment a security and communications device includes secure software applications. In one possibility secure software applications operate in an application virtualisation environment supported by the security and communications device. Preferably data stored on the data store of the secure communications device is readable only with these secure applications and is never under the control of the host computer or of a host computers operating system. As will be appreciated by the skilled practitioner in the context of the present invention, application virtualisation is a system in which a file system and registry are virtualised to provide an isolated environment in which to run a software application. Application virtualisation operates by encapsulating applications from the operating system on which they are executed. Such applications are not installed in the traditional sense accordingly the operating system and other applications running on it cannot gain access to data held within a virtualised application. More commonly such methods are used to protect computer systems from naïve or malicious users. Advantageously by enabling an application to run in a virtual environment which can be erased after use a host computer may be used to access data without that computer having direct access to the data being read or written.

A remote monitoring station is operable to transmit security commands to a security and communications device, for example to delete secure information or verification information to prevent use of or access to data stored on the data store of a security and communications device. A security and communications device can be configured only to permit access to stored data during certain time intervals. In one possibility a certain time interval recurs periodically, for example during certain times of day or particular days of the week. Optionally a time interval may be a time limit, for example data may only be accessed until a particular time in the future, or only after a particular time or date.

In one possibility a security and communications device will prevent access to stored data, or operate to inhibit operation of a host computer if it is not able to communicate with a remote monitoring station. Optionally if it is not able to communicate with a remote monitoring station a security and communications device may delete or overwrite stored data.

A security and communications device has a housing and an interface for connection of the device to a host. Coupled to the interface is a controller which is connected to a data store, and to a security element which element comprises a wide area communications device. The security element comprises a GSM module for sending and receiving data on a GSM network. In one possibility the security element comprises additional location determining means, for example a GPS module.

The controller is operable to perform data operations on the data store, for example data read and/or write operations and data delete operations. The data store controller is further operable to send and receive data and data operation commands passed between the host device and the data store of the security and communications device. For example the controller comprises a USB mass storage controller.

In an example of the invention the controller is configured to communicate data and/or data operation commands with the security element. In one possibility the controller provides a standard USB mass storage controller input which is coupled to the interface such that, as measured from the host device the communications and security device is indistinguishable from a standard USB mass storage device, for example a standard flash memory "key". Advantageously, additional functions of the controller, for example security functions, are not controllable by the host because the host only has physical access to data read and write operations of the controller as if it were a typical USB mass storage device. The security element is configured to perform security monitoring operations for example to transmit device operation data, for example to transmit data operation commands received by the controller or to transmit data operation commands performed by the controller, or to transmit data that is written or read during data read or data write operations performed by the controller. In one possibility device operation data is transmitted with information about the specific data which has been read or written during a device operation Any memory storage device has a controller for managing data operations performed on the storage medium. As measured from the host device a memory storage controller will appear as a collection of input and output lines and one or more control lines. The host device can only influence those aspects of an attached peripheral device with which it shares a physical interface.

The present invention includes reporting functionality which relays information about data operations and data operation commands from a memory storage controller to a remote monitoring service. Advantageously the interface to the host device is identical to a standard storage media interface therefore the reporting functionality is entirely outside the control of the host device.

In an example the reporting functionality is pre-programmed and operates autonomously according to a pre-programmed rule set, optionally according to a reporting time schedule. In one possibility the reporting functionality is operable to receive commands from a remote monitoring service, examples of commands include rule sets for operation of the security and communications device.

In one possibility a pre-programmed rule set includes a set of reporting and access control rules for controlling access to the storage medium of the security and communications device and for controlling the reporting function of the security and communications device. In an example access control rules require a secure handshake with a remote monitoring service and security confirmation, for example transmission and receipt of an encryption key, before the host device is granted access to data stored in the data storage medium of the security and communications device. In another example a pre-programmed rule set includes a programmed instruction to report data operation information, that is to say information describing operations performed by the memory storage controller. Optionally this information can include any data that is read, written or deleted to enable a remote monitoring service to compile a comprehensive history of data stored on and read from the device and to compile a real time back up of any data written on the device.

Transmitted information can include data audit information such as user identification information, time and date information, location information, data operation information and other information. Optionally a rule set includes reporting rules, for example data audit information can be transmitted when a security and communications device is attached to a host device and periodically or intermittently thereafter. In one example reporting information is transmitted whenever a data operation is performed, optionally reporting information may be compiled, for example to include a minimum quantity of data audit information. A minimum quantity of data audit information may be a minimum number of data operations, or a minimum quantity of data, for example a predetermined amount, for example 10 KB, or 256 KB, or several MB.

In one possibility a security and communications device prevents access to a data store of the security and communications device until verification has been received from a remote monitoring station, for example by a secure handshake and security confirmation. In this example, when a security and communication device is coupled to a host device it sends a wake up message to a remote monitoring service. Optionally a wake up message includes at least one of a unique identifier, available data audit information, device status information and location information. A wake up message may be sent as a secure or encrypted message, for example as an SMS, MMS or other GSM mediated message. Where a security and communications device includes suitable wide area communications devices a wake up message may be sent as the start of an online hand shake and exchange process.

In one example transmitted information includes time information, location information, host device information, for example the MAC address and/or IP address of the host device, a user ID indicating the user name of a user currently operating the host device in addition to one or more unique identifiers. In examples a unique identifier acts to prevent spoofing or false reporting from the security and communications device.

On receipt of a wake up message from a security and communications device the remote monitoring service sends a reply indicating a status of the device for example an ordinary status or a security status.

In one possibility all information transmitted by a security and communications device is labelled with a unique identifier. For example, all SMS messages comprise 140 octets of text message data and at least one user data header. In one possibility one or more fields of a user data header are reserved for a unique identifier or for other security information. Optionally to prevent spoofing a unique identifier is hashed with a time or date stamp. In one possibility a security and communications device employs a public verification and forward secrecy protocol to provide secure SMS as in the Secure-SMS protocol. A secure application layer protocol is used to embed a selection of security attributes, including a unique identifier and other unique device attributes in the SMS messages. This is based on the use of shared keys to develop secret and symmetric encryption to inhibit the interception and spoofing of security messages or verification replies.

Figure 1:
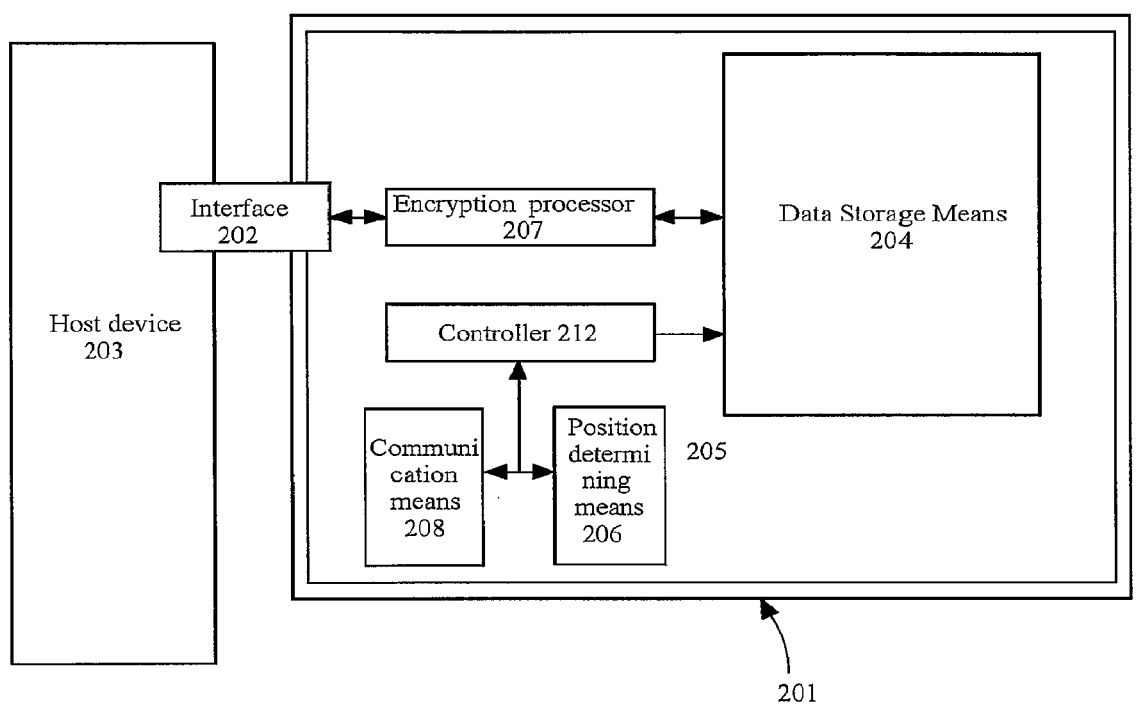
FIGS. 1, 2 and 3 show functional block diagrams of an example of a secure data storage device.

The example of FIG. 1 provides a memory storage device 201 having an interface 202 for coupling to a host device 203, memory storage device 201 comprising data storage means 204, a housing 205, position determining means 206, a wide area communication interface 208, an encryption and security processor 207 and a controller 212. The controller 212 is coupled to the encryption processor 207 and to the data storage means 204, the wide area communication interface 208 and the position determining means 206.

The housing 205 provides a secure housing comparable in size to, or slightly larger than, a standard memory storage device. In this example the interface 2 to the host device is incorporated into the housing 205, in other examples the interface may be provided by a connector extending on a fly lead from the housing 5. The housing is provided with a tamper resistant seal, for example a sonic weld, and is arranged such that any attempt to open the housing will result in damage to the data storage means 204 and loss of any stored data.

The encryption processor 207 encrypts data stored in the data storage means 204 and is operable to remove encryption from data retrieved from the data storage means 204. The encryption processor acts under control of the controller 212. This arrangement enables the device to encrypt all data stored on the data storage means without the encryption keys ever being present in the memory of the host device. Authorisation to enable temporary access to encrypted data may be provided by use of a password or biometric device, for example a fingerprint reader, or by other user identification means. Optionally encryption keys and authentication may be supplied remotely, for example by a message received by the wide area communication interface 208.

The wide area communication means 208 is operable to send and receive information using secure messages. Secure messages may comprise commands relating to security and encryption functions of the secure memory storage device 201; commands to delete an encryption key from the encryption processor; commands to delete data from the data storage means; commands to apply a physically damaging voltage to the data storage means; commands to apply a physically damaging voltage to the data storage means to disable the data storage means; or to permanently or temporarily disable the encryption processor; or to transmit a message containing position information. This enables the security of stored data to be managed remotely, for example, access to the memory store on the removable drive can be turned on and off remotely.

Further security is also provided via the ability of the removable drive to only become active when it determines that it is in an authorised location. This facility is provided via the position determining means, for example provided by an integrated GPS receiver. The position determining means 206 is operable to receive location information and to calculate location information. In this example the controller 212 is provided with location information which describes at least one authorised location in which access to the stored data may be permitted. Where position determining means determines that the current location corresponds to an authorised location the controller 212 can enable access to encrypted data. Where the position determining means provides location information corresponding to an unauthorised location the controller 212 can disable access to data, for example encrypted data, for example by moving, overwriting or removing an encryption key.

In another possibility when the removable memory is inserted into a host computer the controller is configured to cause the position determining means to obtain location information which is transmitted using the wide area communication interface 208 to a specified receiver, for example to a device controlled by an owner or authorised controller of the memory storage device 201. The transmitted location information is then compared to a list of authorised locations. If it is determined that the device is in an authorised location encryption keys are transmitted to enable stored data to become available at the new location. In other embodiments a list of authorised locations may be stored within the device.

A wide area communication interface 208 may be a GSM unit, and the position determining means may be for example a GPS unit. In these examples signals received by the GSM unit 208 may contain authorised location update information to amend the list of authorised locations, other signals received by the GSM unit 208 may contain commands to transmit GPS information. Advantageously, if the memory storage device is without power (not plugged in to a host device) at the time a message is sent to it the message will be queued remotely until such time as the memory storage device is provided with power, for example when an attempt is made to use the device.

The controller 212 has a non-volatile memory (not shown) storing instructions to perform one or more of the following actions: to delete data from the data storage means 4; to disable the encryption processor 7; to change or delete an encryption key of the encryption processor 7; to delete a directory structure of the data storage means 4; to overwrite a directory structure of the data storage means 4; to modify data on the data storage means 4; to delete nominated data from the data storage means 4; to read and transmit data from the data storage 4 to a remote device (not shown); to activate a position determining means; to perform a location measurement using the position determining means; to transmit location information; or to perform any combination of the foregoing actions and/or other actions.

Advantageously, because the controller stores commands to perform the above described actions a received security message can reference a memory location of a stored instruction rather than encoding the entire instruction in the message.

In an example of the invention the controller 212 is operable to delete stored data from the data storage means should the device go missing. Advantageously, provision of the embedded position determining means, for example a GPS receiver, enables the location of the device to be identified for added security or recovery in the case of loss.

In another example, where the removable memory is attached to a host computer and is loaded with information, information is encrypted as it is stored. When the removable memory storage is detached from the host access to the data is disabled until authorisation is provided. In another possibility stored information is not encrypted, rather access to stored data is prevented or inhibited by other data security means for example, data retrieval functions of the data storage means or of the controller may be disabled. Data access authorisation may be provided by one or more of the following: password input, remotely transmitted via secure SMS, GPRS signals, or 3G signals.

Examples of the invention provide remote activation of the data storage means 204 and encryption processor 207 to enable access to stored data via the GSM network using SMS, GPRS or 3G and to location information from a GSM Cell ID or GPS. Optionally a status setting may be used to indicate a status of the device. For example if a device is missing or presumed stolen a status setting may be used to provide instructions to the device to perform security actions. In another possibility, where the location of the device is known the status may be set to allow normal operation of the device.

Figure 2:
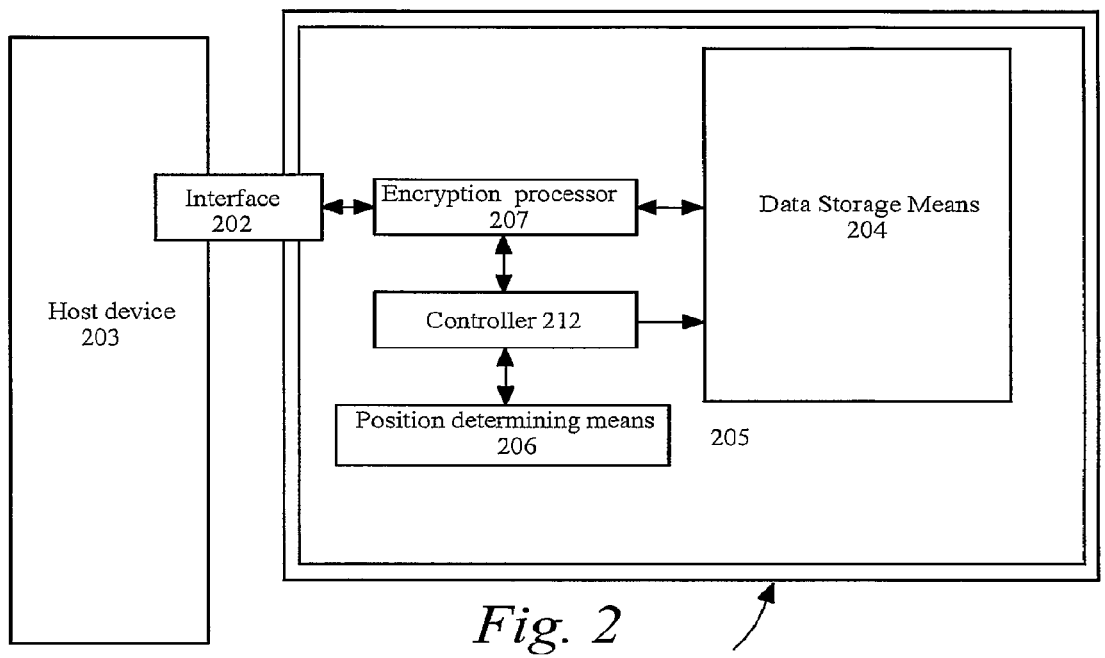

FIG. 2 shows a secure removable data storage device 11 according to an example of the invention. In this example a secure removable data storage device 11 is provided having a housing 205, an interface 2, an encryption processor 7, a data storage means 204, a position determining means 6 and, a controller 212 which has a non-volatile memory (not shown).

The non volatile memory (not shown) of the controller 212 is operable to store encryption information and permitted location information and other information, for example permitted host device information. The controller 212 is operable to control the data storage means 204 and to provide, withhold or delete encryption information in order to enable or disable the encryption processor 7.

When a removable data storage device is attached to a host device, or prior to the performance of a data storage or retrieval operation the controller is operable to obtain current location information using the position determining means 6. Current location information is then compared with stored permitted location information and, in the event it is determined that the current location is a permitted location, the controller 212 acts to enable the encryption processor 7. In the event that it is determined that the current location is not a permitted location the controller acts to disable the encryption processor, for example by withholding encryption information. Encryption information may be, for example, encryption key information or other encryption algorithm information.

Figure 3:
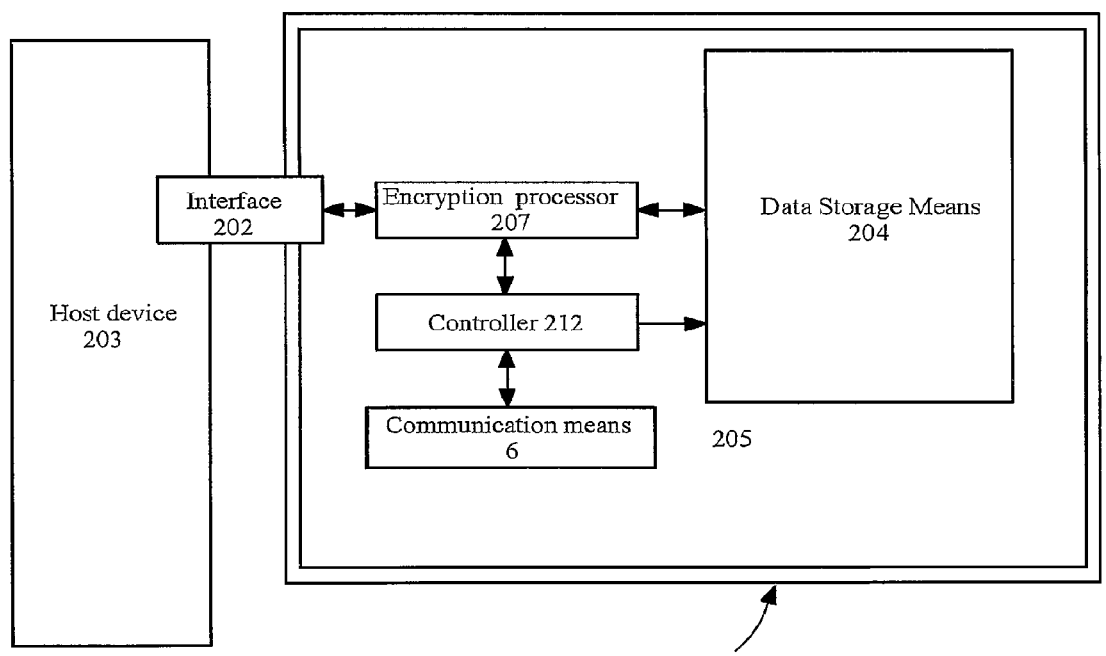

FIG. 3 depicts a secure removable data storage device having a USB interface 202 for coupling to a host device 203, secure removable data storage device 1 comprising data storage means 204, a housing 205, a communication means 8, an encryption and security processor 7 and a controller 12. The controller 212 is coupled to the encryption processor 207 and to the data storage means 204, and the communication means 8.

In this example the communication means is operable to send and receive secure messages from a remote device. Secure messages may include explicit commands or references to memory address locations of the controller 12, such messages may comprise commands to perform one or more of the security actions described above with reference to the non-volatile memory of controller 12.

In this example encryption information can be maintained in the encryption processor. The decryption of encrypted data is enabled by the provision of an enabling flag from the controller. In this example the controller does not retain encryption information but is operable to respond to commands to enable or prevent decryption of stored information. Commands to enable or prevent decryption of information can be provided by a user of a host device, for example using a password, or may be provided by a secure message.

In another example a secure memory storage device may make use of remote authorisation. In this example authorisation passwords (and/or encryption keys) are transmitted from a remote source via the GSM network. Examples of the device are configured such that encryption keys are transmitted from a remote source and held in a volatile memory of the secure data storage device during authorised use of the device these examples are further configured such that, when an authorised use ends, for example when the data storage device is removed from a computer, the encryption keys are overwritten in the volatile memory. By this method a user of a device need not have access to the encryption information required to operate a device. For example a user of a secure data storage device may request the transmission of encryption keys to the device. Transmission may be from an automated server, for example in response to a password request, or from a human operated device, for example in response to a telephone call to request authorisation. In an example a user may be provided with a distress password which may be used when they are forced to enter a password under duress. In response to use of a distress password access may be given to a subset of the protected data or to decoy data or to low value data. In addition, in response to use of a distress password the device may transmit an alarm signal, optionally including location information, to emergency services or to a monitoring station or to any suitable remote device.

The drawings accompanying this text provide functional representations of components of the invention and, in the interests of clarity, not all connections have been shown for example power connections have been omitted. In addition the depicted functional units may be provided as discrete components or as integrated units, for example as a single semiconductor. The example of FIG. 3 provides a data security and communications device having a computer interface 202 for communicating data with the computer and for deriving a power supply from the host device 1. A communication means or wide area communication interface 8 for communicating with a remote device via a wireless network is coupled to the computer interface 202. The data storage means 204 is connected to the computer interface 202 as shown. The computer interface is arranged to couple the derived power supply to the memory and the wide area communication device. This power supply coupling is provided via switches which control the power supply coupling between the computer interface and the memory and the power supply coupling between the computer interface and the communications means or wide area communication interface. The encryption and security processor is coupled to the wide area communication interface 8 and is operable to control the power switches in response to a received command. For example the controller is operable to switch on the power supply to the memory in response to a received command or to switch off the power supply to the memory in response to a received command.

Preferably the encryption and security processor is integrated with the wide area communication interface 8. Optionally a power control switch is integrated with the data storage means 204.

Likewise, optionally, a power control switch is integrated with the wide area communication interface 8.

Preferably the computer interface 202 includes a hub and the hub and/or the communication means 8 and/or the data storage means 8 are encapsulated. Preferably this inhibits the data storage means from being decoupled to allow the power supply to the memory to be controlled independently of the wide area communication interface.

As will be appreciated each of the features of this embodiment may be replaced with any appropriate corresponding features taken from other embodiments aspects and examples described herein. For example, preferably the computer interface is a USB interface, optionally or additionally a USB interface includes a hub. Optionally a power supply derived from the computer is a standard USB power supply coupling. Any equivalent interface or USB derivative may be employed. In preferred embodiments a data security and communications device includes an energy storage means, for example a capacitor or a battery coupled to be charged by the derived power supply.

In some examples multiple memories are provided and only one of these, or a subset of these, is switched on depending on the command received. This enables different data to be made accessible to a user of the device depending on the received command.

The wide area communication interface includes a controller arranged to process at least one security command received by the wide area communication interface and to put the security device into a protected state in response to the received security command.

Preferably a wide area communication interface is a GSM interface. In these examples a received command may be received in the form of an SMS message. Optionally the controller of the GSM module is configured so that a switch can be controlled by an SMS message to turn the power supply to the memory on and off. With the memory switched off it is not possible to read or write data to/from the memory because it is without a power supply.

The assembly can be encapsulated so that an attempt to disassemble the memory from the power switch control makes the memory unusable It is possible for the GSM chip to control its own power supply. If the GSM is sent a command to kill its own power supply then the GSM chip can be permanently disabled.

In the described example a USB interface has been described, it will be appreciated that this is merely exemplary and the use of other interfaces is anticipated. The interface may for example be any derivative of a USB interface such as a USB 1.0, USB 1.1, USB 2.0, USB 2.1, USB 3.0 or any other derivative of a USB interface. Alternatively or in addition the interface may be a PCMCIA interface or any derivative thereof, an ExpressCard interface, PC-Xpress interface, a FireWire interface or any other interface.

The data storage device may be arranged to conform with a standard USB form factor, such as a USB dongle form factor, a PCMCIA form factor or a PC-Xpress form factor or any other standard or non standard form factor.

Where references have been made to solid state data storage devices these may be interpreted to include other data storage means, for example hard disk drives or optical storage devices. Use of examples of the invention will now be described with reference to FIG. 4.

Figure 4:
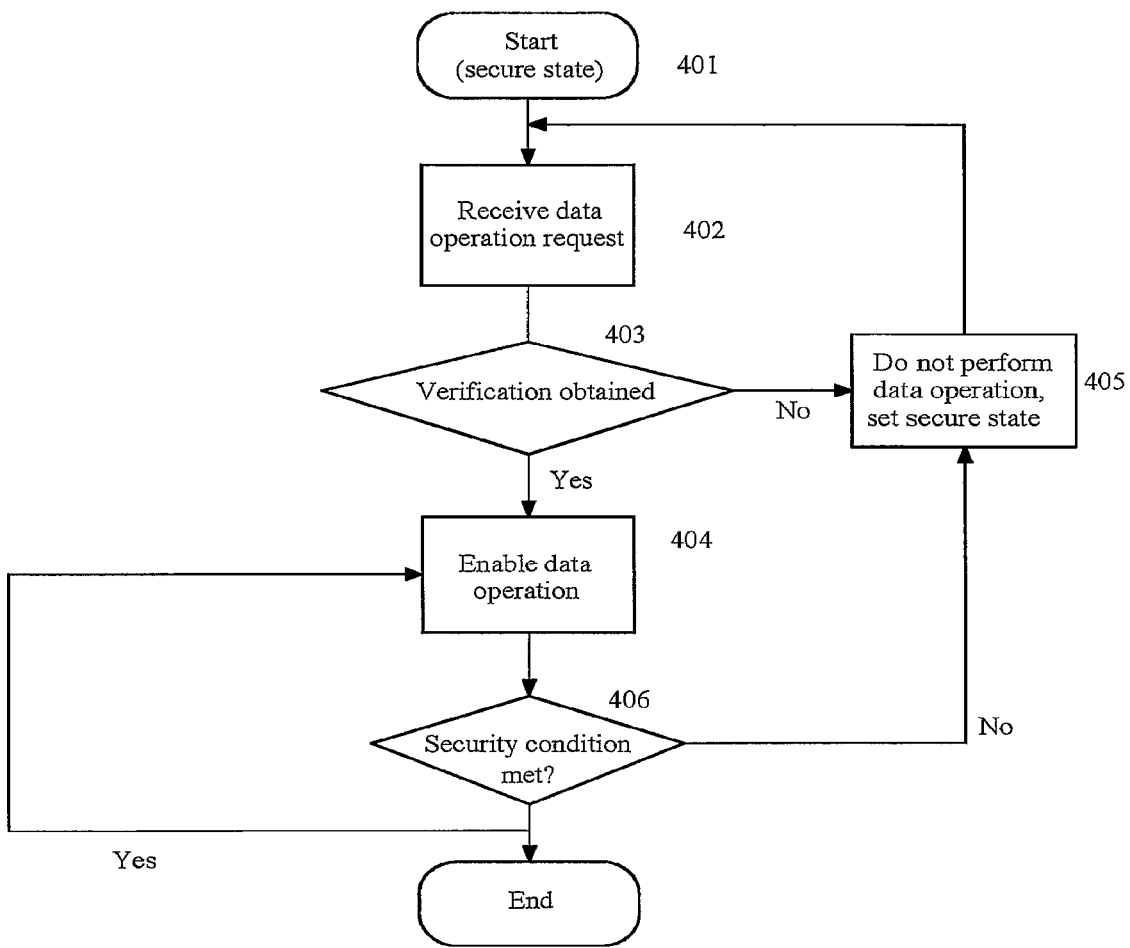
FIG. 4 illustrates a general scheme of operation of a secure data storage device.

FIG. 4 shows a flow diagram illustrating modes of use of examples of the invention. When it is inactive or not being used a secure data storage device will be in a secure state 401, that is to say stored data protected by an encryption or by disabling of the data retrieval mechanisms of a data storage means or by another data security method. When a data operation request is received 402, for example a request to write data to or retrieve data from data storage means a verification step is performed 403. If at 403 verification is not obtained the data operation is not performed and the secure state is maintained 405, if the device was not previously in a secure state a secure state is set in response to the lack of verification. If at 403 verification is obtained the data operation is enabled 404. Following a data operation it is determined whether a security condition is met 406. If a security condition is met a further data operation 404 is enabled. If a security condition is not met a further data operation is not enabled and the device is set to a secure state 405.

The above described method is illustrative, particular examples of the invention may operate according to and within the principles of this method or may operate by other methods.

In some particular examples a secure state 401 may be entered when: a secure data storage device is disconnected from a host device; a time period has expired; a number of data operations have been performed; data operation requests exceed a specified rate or volume threshold, for example a threshold indicating wholesale copying of data; an external command is received; an external command is not received; external command is not received within a specified period of time; a data operation request is made relating to particular data, for example protected data.

Secure states 401 are provided in examples of the invention by encryption methods or by preventing access to a data storage means or to a portion or portions of a data storage means by a combination of these encryption and access control methods. Features of secure states may comprise: locking a data storage means or memory; withholding encryption key information; obfuscating encryption key information; encrypting a directory structure of a data storage means. Optionally, depending on determined location information, data may be provided to the data storage means of the device via the wide area communication interface, for example data specific to a particular location or country can be provided.

Verification 403 may be obtained for example by: a user supplied password; a password supplied automatically, for example a password held in an authorised device; by a verification of a current location, for example by a location determining means, such as a GPS device or a location determining GSM device; a password sent from a remote device, for example by an SMS message which may be a 3G message or a GSM message; sending location information to a remote device and receiving authorisation for the location; or any combination of the foregoing verification methods. Optionally different levels of verification may be provided, for example different data or data containers may be assigned different passwords. Different levels of verification may be provided based on a combination of determined location information, the authorisation level of a user and the time of day. For example during normal working hours in an authorised location a particular user may be granted access to a first set of data and outside normal working hours, in the same location the same user may be granted access to a second set of data and, outside normal working hours and in another location the same user may be granted access to a third set of information. Preferably the access to stored data which is provided may be controlled depending on determined location information and/or time and date and/or the identity of a user or a combination of any of the foregoing.

A security condition 406 may be met, or may fail to be met when, for example; a time limit since a verification action 403 was performed; a number of data operations have been performed; data operation requests exceed a specified rate or volume threshold, for example a threshold indicating wholesale copying of data; an external command is received; an external command is not received; external command is not received within a specified period of time; a data operation request is made relating to particular data, for example protected data; or any combination of the foregoing security conditions may be applied.

For example a removable data storage device is provided in which a controller is configured to delete data in response to receiving a remote command, for example a secure SMS message.

In an example encryption keys are not stored on the device. Encryption keys must be retrieved from a remote device via the wide area communication interface, for example a remote device provides the encryption information to the secure data storage device in response to receiving authorisation information. Authorisation information may be location information and/or user identity information and/or a password.

Preferably different data is stored or encrypted separately on the data storage means, for example separately encrypted containers are provided. Each container may contain data relating to a particular project, a particular location or a particular user. In these examples where a user wishes to record new information new containers may be created for that new data.

Data may be marked with specific expiry dates. On or after a specific date the controller of a secure data storage device can be configured to delete information marked with an expiry date which has passed. Preferably different data can be held in separately encrypted containers marked with separate expiry dates. The processor of the secure data storage device can be configured to delete specific containers on a specific day (or in response to some other condition such as location information) or they can be deleted in response to specific commands.

Using separately encrypted containers enables deletion of particular packages of data without the need to decrypt them locally.

Figure 5:
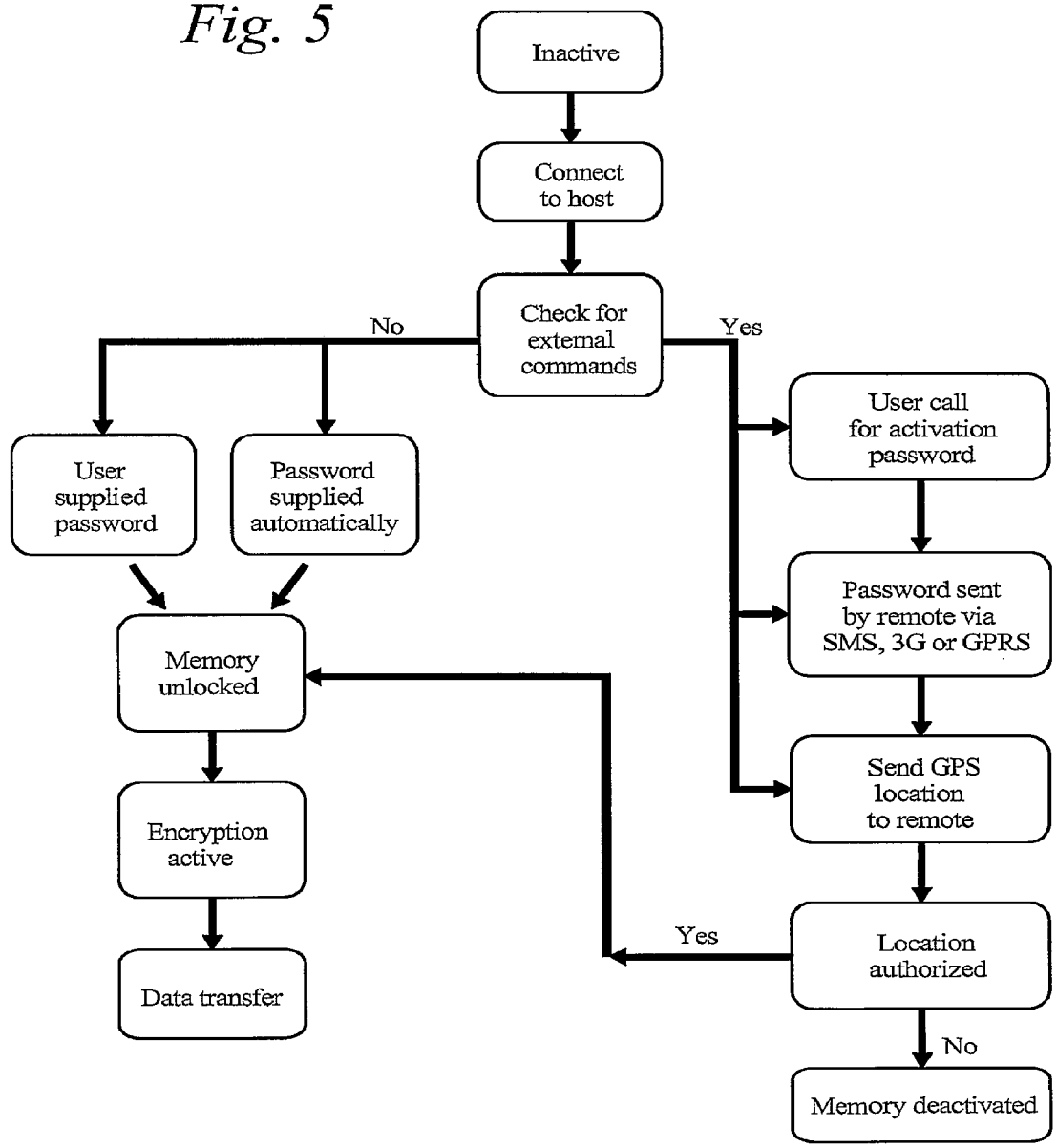
FIG. 5 illustrates a specific scheme of operation of a secure data storage device.

FIG. 5 provides a schematic representation of a scheme of operation of embodiments of the present invention.

In the above described examples and aspects of the invention a removable memory device may be a USB memory stick, or a removable hard disk or any other removable memory device. In another possibility in any of the above described examples and aspects of the invention the GPS unit or receiver may be replaced by any appropriate location determining means, for example a cellular wireless location determining system, or a GSM location determining means, an internet (IP) based location determining system or any other suitable location determining means. In another possibility a GSM unit may be a wide area communication interface, a cellular wireless device, an internet protocol device, a wifi interface, a GPRS, UMTS or 3G device or any other appropriate communication means or communication interface.

Figure 6:
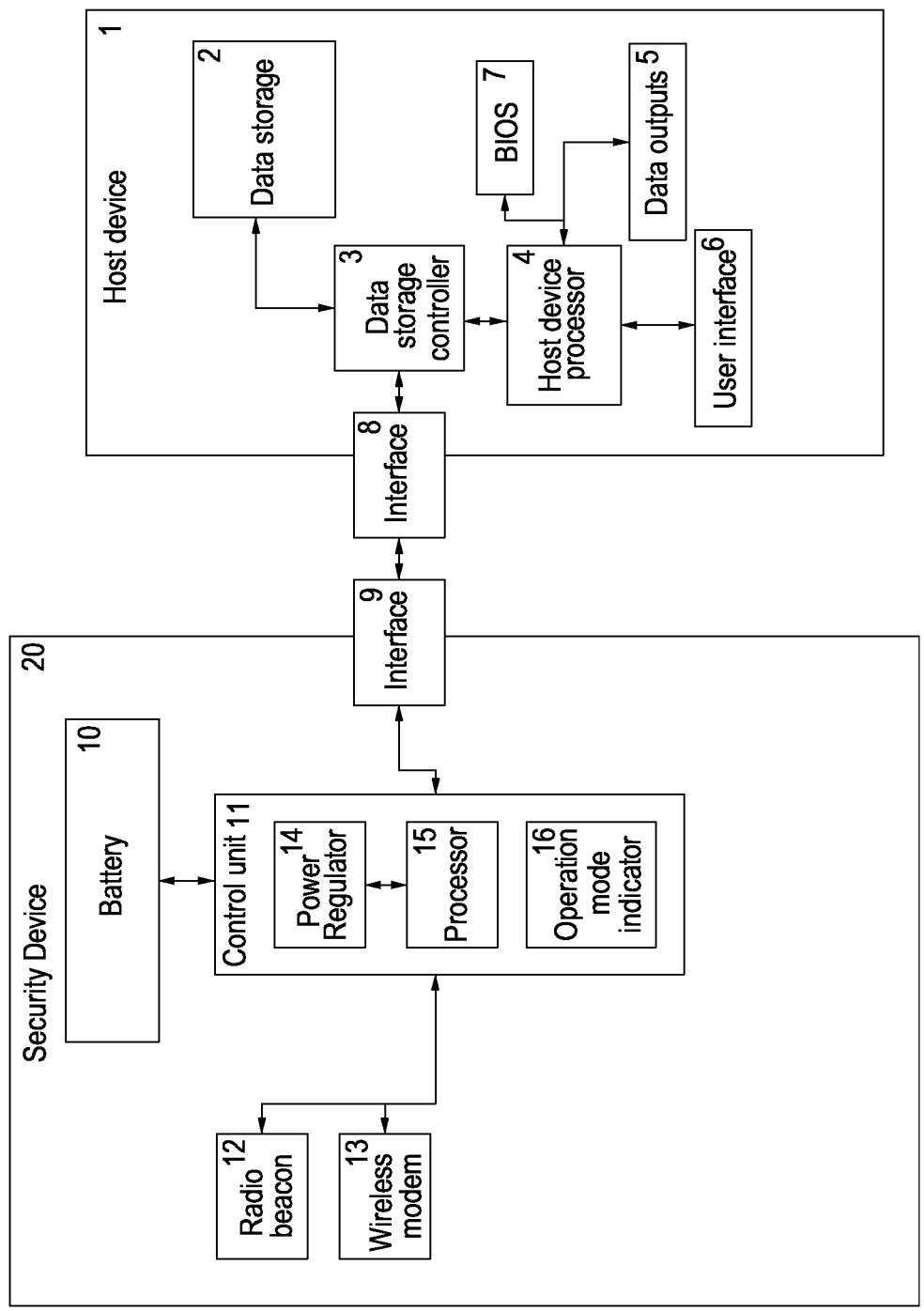
FIGS. 6, and 7 are block diagram representations showing components of a host device and a security device in first and second examples.

Referring now to FIG. 6 a security device 20 is shown with a host device 1.

In an example embodiment a host device 1 has a BIOS 7, a processor 4, a data storage 2, a data storage controller 3, one or more data outputs 5 and a user interface 6. The data storage device 2 may be provided by a hard disc, flash memory, rewritable optical media and/or other data storage device. The BIOS 7 is operable to control the basic operation of the host device and its components and to initiate and control a boot or power-up sequence of a host device 1. The BIOS 7 identifies and initiates component hardware connected to the host device to prepare the machine so other software programs stored on various media can load, execute, and assume control of the host device. The BIOS 7 is a coded program embedded on a chip that recognizes and controls various devices required for the operation of the host device 1. Generally the BIOS 7 is operable to control the host device 1 at a lower level than an operating system or other installed software.

The data storage controller 3 allows the processor 4 of the host device to communicate with the data storage device 2, this may for example be provided by a device driver or firmware.

The host device processor 4 is operable to control overall operation of the host device generally in response to commands received from a user via a user interface 6. The host device also has one or more data input/output devices 5 such as serial ports, Ethernet ports or other data connections.

The host device 1 is provided with an interface 8; in this example an interface 8 is a USB interface.

In the example of FIG. 6, the security device 20 has a battery 10, a control unit 11, a radio beacon 12, a wireless modem 13 and an interface 9. The interface may for example be any derivative of a USB interface such as a USB 1.0, USB 1.1, USB 2.0, USB 2.1, USB 3.0 or any other derivative of a USB interface. Alternatively or in addition the interface may be a PCMCIA interface or any derivative thereof, an ExpressCard interface, a FireWire interface or any other interface.

The wireless modem 13 and radio beacon 12 are operable in response to control signals provided by the control unit 11. In this embodiment the wireless modem 13 is operable to provide usual wireless modem functionality to the host device in addition to its security functions. However, even when being employed for usual wireless modem function the processor 15 of the security device retains control of the wireless modem 13 and may use some or all of the bandwidth for security functions. Preferably at least 90% of the wireless modem bandwidth may be provided to the host device for usual wireless modem functionality while the remainder is used for security functions.

A radio beacon 12 is a radio transmitter operable to transmit a radio signal which may be a variable frequency, variable power radio beacon.

The wireless modem is operable to send and receive data under the control of the processor of the security device control unit 11.

In this specific example the wireless modem 13 is a UMTS/HSPDA cellular modem controlled by the control unit 11 of the security device which has an IP stack. The wireless modem 13 is operable to send and receive SMS messages and to communicate these messages to the control unit 11.

SMS messages sent to the unit are queued remotely for collection. This means that messages sent to a device will be queued while a device is offline or without power and will be delivered to the device when it becomes available. The wireless modem may be a GPRS modem or derivatives, a UMTS/HSPDA modem or derivatives, or a 802.11 wireless modem with a GSM capability, or any other type of wireless modem without limitation. If a particular type of wireless modem does not have a GSM capability for sending and receiving SMS messages a GSM capability is provided in addition or separately.

The control unit 11 is operable to send and receive SMS messages via the GSM capability independent of the host device being turned on or off.

Sent messages may comprise for example location information and/or device status information. The wireless modem is further operable to receive queued commands from a remote command queue and to communicate received commands to the control unit 11. Received commands may comprise commands to operate one or more components of the security device, or to provide a command to the host device, or the data store controller of the host device to perform a security action. If the host device is turned off when a command for the host device is received the security device will issue the command to the host device when the host device is next turned on.

Compared with other components of the device the GSM unit has relatively high power requirements. The GSM unit is normally maintained in a sleep state or a low power state or kept switched off completely at intervals the power regulator will switch the GSM unit into an operational state to check for messages.

The duration of the intervals is managed by the power regulator and the processor in response to a number of conditions. A security message may be used to switch the device into a secure state. In this state the GSM unit may poll for SMS messages once every 5 minutes, or once every 15 minutes, or once every 30 minutes, or once every hour, or twice a day, or and in addition to polling for messages every time the host device is powered up. The received security message can contain an instruction to poll for more messages with a certain frequency, which may be a frequency selected from the foregoing list, or may be another frequency. The power regulator may override an instruction contained in a security message if following an instruction would cause power availability to compromise operation of the device.

In a normal state of operation the security device may poll for messages once a day, or twice a day, or once an hour or more or less frequently.

The control unit 11 has a processor 15 and a power regulator 14 and an operation mode indicator 16 and a memory not shown.

The operation mode indicator 16 indicates a mode of operation of the security device 20.

The power regulator 14 manages the use of power by the device in response to commands from the processor 15, changes in the operation mode indicator 16, and changes in a battery charge level of the battery 10.

The power regulator is operable to switch the control unit between an active state and a sleep state to reduce power consumption. Switching between active and sleep states may be in response to a command received by a cellular modem, a timer, activation of a host device 1 or being connected to, or disconnected from, a host device 1. The power regulator 14 is also operable to recharge the battery 10 by drawing power from the host device 1.

The processor 15 is operable to control all aspects of the security device 20 and to control aspects of the host device 1 via the two interfaces 8 and 9. When it is first installed with a host device, the BIOS 7 of the host device 1 is modified. These modifications cause the BIOS 7 to check that the security device 20 is present before the boot sequence of the host device 1 is allowed to complete. These modifications also cause the BIOS to pass control of the host device over to the security device during the boot sequence of the host device. During this period the security device 20 has control of the host device 1 including its data storage 2 and data storage controller 3. Any security actions waiting to be implemented by the security device can be effected at this point in the host device bootstrap sequence.

In a normal mode of operation during the boot up sequence the BIOS 7 passes control of the host 1 to the security device 20. This may be achieved by a modification to the BIOS or by providing an additional low level device driver for the host device. In either case, control of the host device is passed to the security device during the boot up sequence of the host. In addition to any periodic or intermittent polling for messages, when the host device is switched on the security device can wake up the GSM capability, and check for any queued command messages. The actions required by any received messages are performed before passing control back to the host device 1 to complete the boot up sequence.

The processor 4 has a non-volatile memory (not shown) storing instructions to perform one or more of the following actions: to delete data from the data storage 2 of the host device 1; to disable the data storage controller 3 of the host device 1; to lock the BIOS 7 of the host device 1; to change the BIOS password of the host device 1; to delete a directory structure of the data storage 2; to overwrite a directory structure of the data storage 2; to modify data on the data storage 2; to delete nominated data from the data storage 2; to read data from the data storage 2; to transmit data from the data storage 2 of the host device to a remote device not shown; to encrypt data; to activate a radio homing device 12; or to perform any combination of the foregoing actions. In this example received security messages need only reference a memory address of the processor to issue a command rather than carrying complete instructions to perform the security action or other actions.

Optionally the data storage controller 3 of the host device 1 may be reconfigured with software or instructions provided by the present invention. Preferably these cause the data storage controller to encrypt all data stored in the data storage of the host device 1. In these optional embodiments any data retrieved from the data storage of the host device 1 must be read using an encryption key provided by the security device. Optionally, in use the data controller 3 must retrieve encryption information from the security device such that when the security device 20 is not in place data may not be readably retrieved from the data storage 2 of the host device 1.

In some embodiments software provided for the host device 1 periodically or in response to a specific command creates back ups of data stored on the host device 1 data storage by relaying data to a remote data storage facility not shown.

In other embodiments a security device keeps track of data back-up procedures. Optionally a security device may be operable to transmit data from a host device 1 that was recorded since the most recent back up procedure. Optionally a security device may be operable to transmit data recorded recently. Preferably this data may be data recorded after a predetermined date. In some embodiments this date is provided in a command message received by a security device. In some embodiments a security device is operable to transmit data from a predetermined directory or file of a data store of a host device 1. In embodiments a directory or file or another specification of certain data may be specified in a command message so that specified data may be transmitted to a remote device additionally or alternatively data specified in a command message may be deleted.

Figure 7:
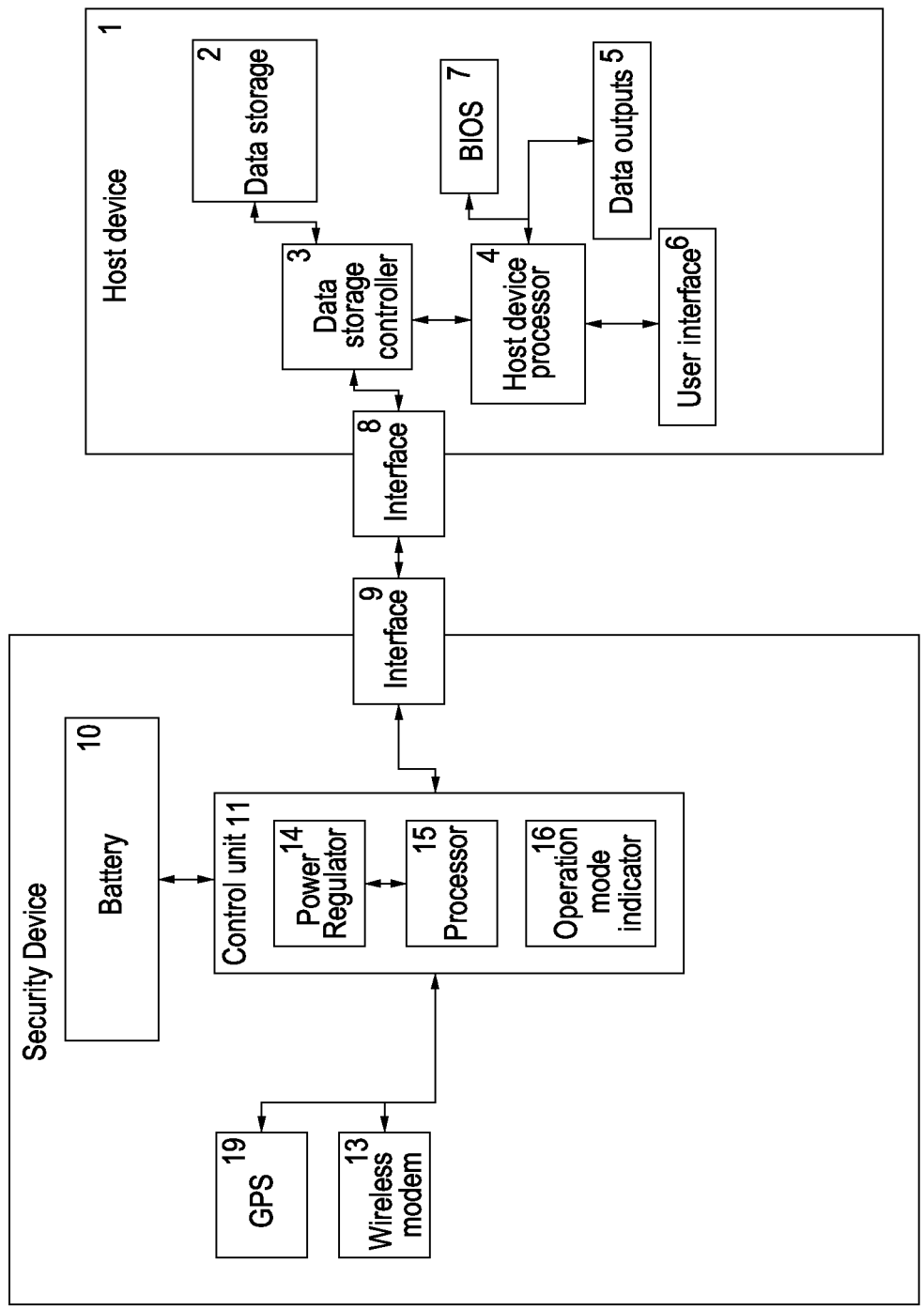

Referring now to FIG. 7 a further a security device 21 which is an embodiment of the invention is shown with a host device.

A host device is provided having identical features to those described above with reference to FIG. 6.

In this embodiment the security device has a control unit 11, a wireless modem 13, an interface 9 and a battery 10 as described with reference to FIG. 6. The security device also has a GPS module 19 operable to determine location information based on a GPS signal. The GPS module is operable to pass location information to a processor 15 of a control module 11.

Power supplied to the GPS module 19 may be regulated by a power regulator 14 of the control module 11. The operation of the GPS module is described in more detail with reference to FIG. 9.

The security device 21 is operable to transmit location information provided by a GPS module using the wireless modem 13 using IP or SMS messaging. This transmission may be in response to a received command, or it may be periodic, or it may be performed each time the host device is switched on, or it may be done in response to a change in an operation mode indicator.

The processor 15 has a non-volatile memory not shown storing instructions to perform one or more of the following actions: to delete data from the data storage 2 of the host device 1; to disable the data storage controller 3 of the host device 1; to lock the BIOS 7 of the host device 1; to change the BIOS password of the host device 1; to delete a directory structure of the data storage 2; to overwrite a directory structure of the data storage 2; to modify data on the data storage 2; to delete nominated data from the data storage 2; to read data from the data storage 2; to transmit data from the data storage 2 of the host device to a remote device not shown; to encrypt data; to activate a GPS device; to perform a GPS location measurement using the GPS device; to transmit GPS information; or to perform any combination of the foregoing actions. A received security message can reference a memory location of a stored instruction rather than encoding the entire instruction in the message. When an SMS message is received referencing a particular memory address the processor executes the instructions, or sequence of instructions associated with that memory address.

Optionally, embodiments of this security device may have a record of authorised geographical locations, optionally in the form of a range of locations. In these embodiments further instructions may be stored in the non volatile memory of the processor 15 which are operable to cause the processor 15 to compare measured GPS location information with the range of authorised geographical locations and if the location information is not within a range of authorised geographical locations the processor may perform a responsive action.

The responsive action may be chosen from one or more of the following: to delete data from the data storage 2 of the host device 1; to disable the data storage controller 3 of the host device 1; to lock the BIOS 7 of the host device 1; to change the BIOS password of the host device 1; to delete a directory structure of the data storage 2; to overwrite a directory structure of the data storage 2; to modify data on the data storage 2; to delete nominated data from the data storage 2; to read data from the data storage 2; to transmit data from the data storage 2 of the host device to a remote device not shown; to encrypt data; to activate a GPS device; to perform a GPS location measurement using the GPS device; to transmit GPS information; or to perform any combination of the foregoing actions.

In normal operation a security device may not respond to location information indicating the device is outside a range of authorised geographical locations, or may not respond for a pre-determined period. Optionally, instructions from an authorised user may override or modify this limitation. In a secure mode of operation the security device may respond immediately, or within a limited time period, to location information indicating the device is outside a range of authorised geographical locations.

Any aspect of the security device may be activated by a remote command received by SMS message. SMS messages may contain power regulation commands, the power regulator may modify or override a received power regulation command to avoid compromising operation of the security device.

In some embodiments a security and communications device has: a control unit 11, a processor, a power regulator 14, a wireless modem 13, an interface 9, and a battery 10, as described with reference to FIG. 6; and a radio frequency homing device 12 and a GPS module 19 operable to determine location information based on a GPS signal. The GPS module is operable to pass location information to a processor 15 of a control module 11.

In these embodiments a power regulator 14 will regulate power to the GPS module 19 the wireless modem 13 and the radio homing device 12 depending on a battery charge level, a received command or a particular mode of operation.

Optionally a security device is provided with a user interface for the collection of security information such as a password, a security number or biometric information. In some embodiments a user interface of a security device is a keypad, a fingerprint reader, an iris scanner or other biometric device.

A control unit of the security device is operable to receive security information from a user interface and, in the event the security information is valid, modify an operation mode of the security device. Preferably this modification may prevent deletion of data or deletion of encryption keys, or enable a permitted geographical location range to be over ridden or altered.

Figure 8:
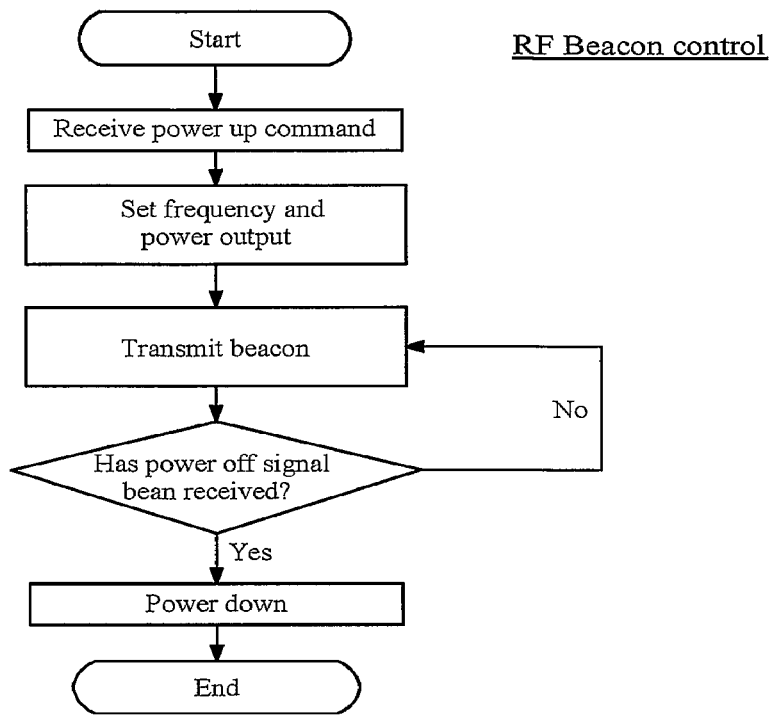
FIG. 8 shows a flow diagram indicating an example control sequence for a radio frequency homing device.

Referring now to FIG. 8 a flow chart is shown indicating a control sequence for a radio frequency homing device.

The sequence is initiated when a power on command is received; optionally a power on command may be provided by a security device or may be from a timer power on command, a geographical power on command or some other trigger.

The radio frequency and power output are selected for the radio transmission. A frequency and power output may be a selected frequency and power or may be a default power and frequency. In some embodiments a power output is selected in response to a power constraint.

In some embodiments a radio frequency signal is transmitted to provide a beacon, in these embodiments a transmitted beacon may be transmitted periodically or at other intervals. In some embodiments a beacon is transmitted in response to a received command. Optionally a received command may specify an interval between beacon transmissions. Preferably a processor of a security device may alter the interval between beacon transmissions in response to a power availability constraint.

When a radio frequency homing device power off command is received a radio frequency homing device may be switched off. In some embodiments a radio frequency homing device power off command is an encrypted command. In other embodiments a radio frequency homing device power off command may be an encrypted SMS message. In still other embodiments a radio frequency homing device power off command may be issued by an authorised user of a host device.

Figure 9:
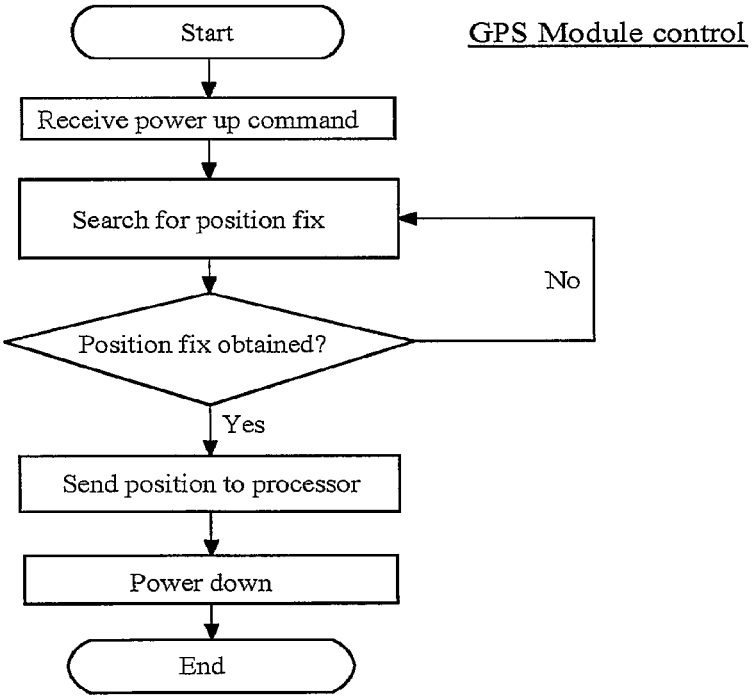
FIG. 9 shows a flow diagram indicating an example control sequence for a GPS module.

Referring now to FIG. 9 a flow chart is shown indicating a possible control sequence for a GPS module of a security device.

Optionally a GPS module may be maintained in a powered state or be maintained in a switched off state. Optionally a powered state may be a fully powered state or a partially powered state. As is known in the art a location acquisition time of a GPS device may be modified by prior knowledge of satellite and ephemeris data. Optionally a GPS device may employ prior knowledge of data to reduce an acquisition time.

Once a location acquisition has been performed location information may be passed to a processor of a security device, optionally location information might be passed directly to a wireless modem or other communication device.

Optionally once location information has been supplied a GPS module is powered down. Optionally powering down a GPS module may comprise: switching off a GPS module or maintaining a GPS module in a powered state.

Figure 10:
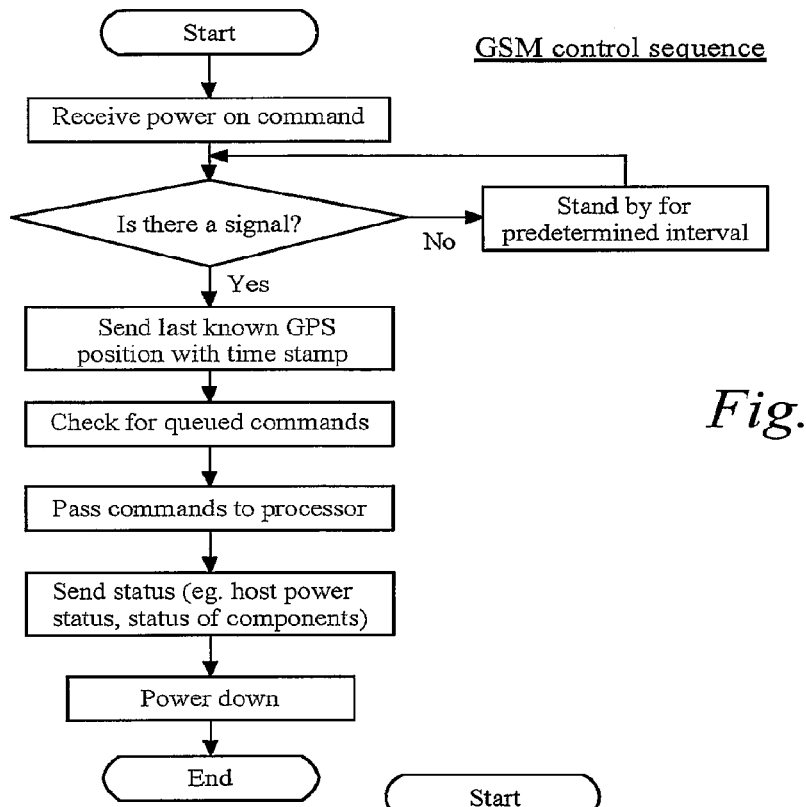
FIG. 10 shows a flow diagram indicating an example control sequence for a GSM communication module.

Referring now to FIG. 10 a flow chart is shown indicating a possible control sequence for a GSM module of a security device which may be a GSM capability of a 3G data card or wireless modem or may be a separate GSM module.

In an embodiment a power on command is received and a GSM module is powered up. In some embodiments ordinarily a GSM module is maintained in a switched off state. Optionally in some embodiments a GSM module is maintained in a powered state. A powered state may comprise a fully powered state or a sleep state or a low power state. Optionally a maintained power state of a GSM module may be selected in response to a command. In some embodiments a command is an encrypted command. In some embodiments a command is an SMS message, optionally an encrypted SMS message. In other embodiments a command may be supplied by an authorised user of a host device.

Optionally when a GSM module is powered up it searches for a signal. In some embodiments if no signal is found a GSM module may enter a sleep state or a low power state for a predetermined interval before searching for a signal again. In embodiments a GSM module may perform a number of signal search and sleep cycles.

In some embodiments not shown if no signal is found in a certain number of signal search and sleep cycles a GSM module may be powered down without performing any further action.

In embodiments when a GSM signal is found location information is transmitted. In some embodiments location information may be a last determined GPS location. In some embodiments a time may be transmitted with location information indicating the time at which location information was determined.

In some embodiments a GSM module checks for queued communication information. In some embodiments communication information may be queued SMS messages. In some embodiments SMS messages may be encrypted SMS messages. Preferably communication information is filtered. In some embodiments filtering communication information may comprise rejecting messages which do not satisfy one or more conditions.

Optionally one or more conditions may comprise examining: an origin of communication information; an originating number of communication information; an originating IP address of communication information; content of communication information; authentication information of communication information, such as a user name and password; or other feature of communication information.

Optionally, communication information that is not rejected may be passed to a control unit of a security device. Preferably communication information that is not rejected may be passed to a processor of a security device.

Optionally received communication information may comprise commands. Preferably commands may comprise references to particular memory locations of a memory of a security device. Optionally memory addresses may refer to a memory location storing a predefined instruction or sequence of instructions.

Preferably once communication information has been received a GSM module may send information. Sent information may comprise status information such as host power status, component status, device power status or other status information. Preferably sent information may comprise host data for data recovery, image data or other information.

Optionally once communication tasks have been performed a GSM module may be powered down. Optionally powering down a GSM module may comprise: switching off a GSM module or maintaining a GSM module in a powered state wherein a powered state may comprise a sleep state, a low power state or a fully powered state.

Figure 11:
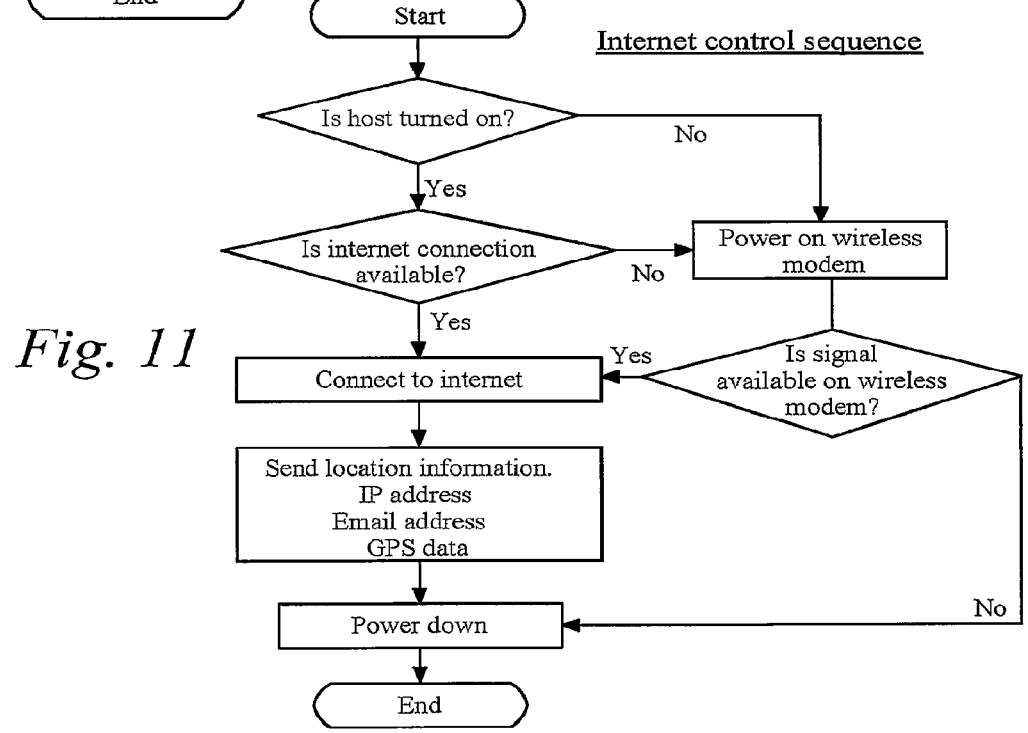
FIG. 11 shows a flow diagram indicating an example control sequence for an internet connection.

Referring now to FIG. 11 a possible internet control sequence for embodiments of the present invention is shown.

Optionally if a host device is turned on a security device will connect to the internet using an internet connection of a host device. Preferably, if a host device is not turned on, or connected to the internet, a security device may provide power to a wireless modem. In an embodiment if a wireless modem signal is available, or if a host device is connected to the internet a security device will connect to the internet. In some embodiments once a security device is connected to the internet location information will be transmitted over the internet. Optionally location information may comprise one or more pieces of location information chosen from a list comprising: an IP address; an email address of an unauthorised user; GPS location information; image information; or other information.

Optionally once a security device has sent information over the internet a wireless modem may be powered down. Preferably powering down a wireless modem may comprise switching off a wireless modem or maintaining a wireless modem in a powered state. Preferably a powered state may comprise a fully powered state or a partially powered state.

Figure 12:
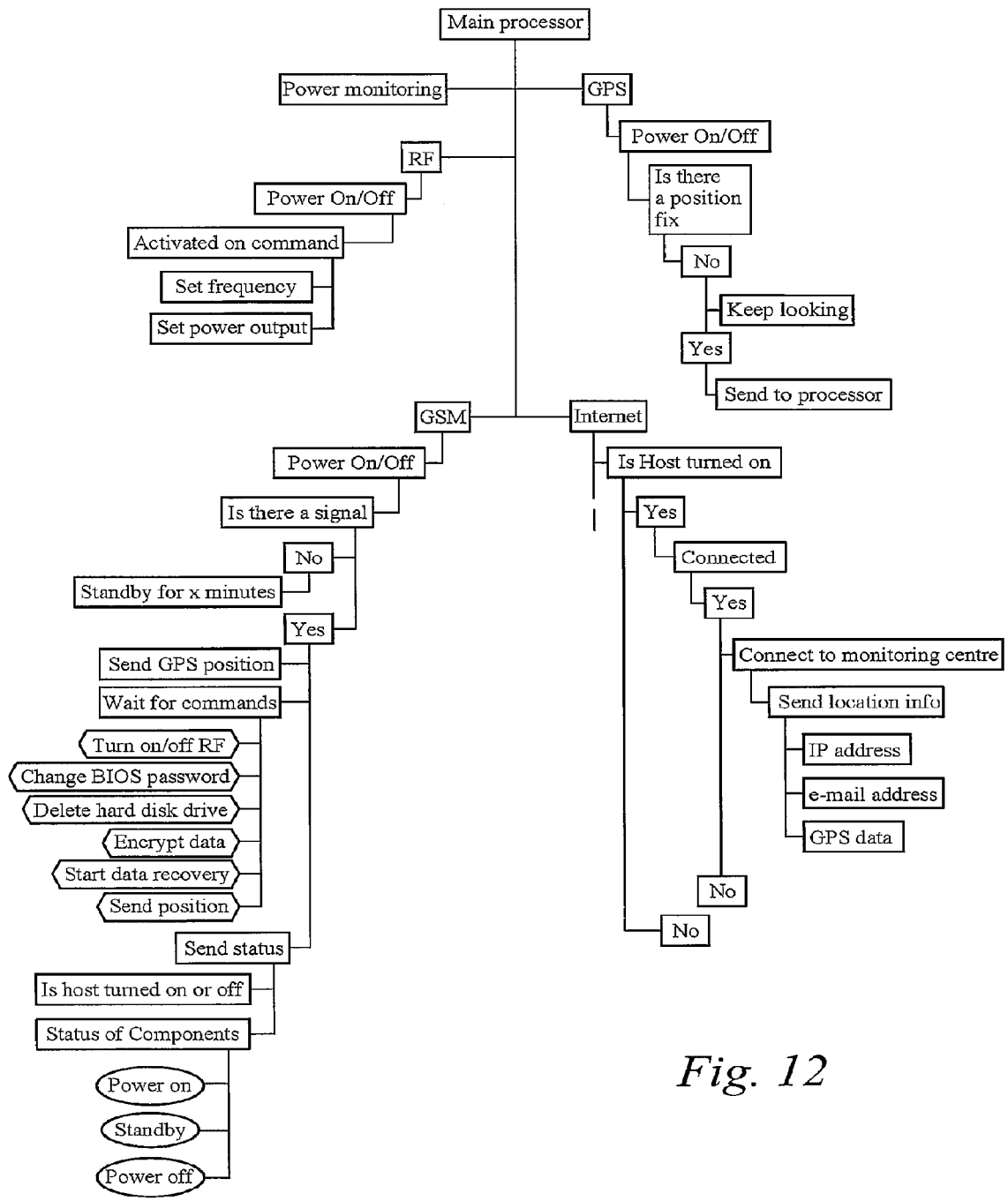
FIG. 12 shows a flow diagram indicating an example control sequence for a control module.

Referring now to FIG. 12 a very schematic diagram of a control sequence for a processor of an embodiment of the present invention is shown. Optionally, detailed functions of each of the branches of this control diagram may be found in the accompanying description.

Figure 13:
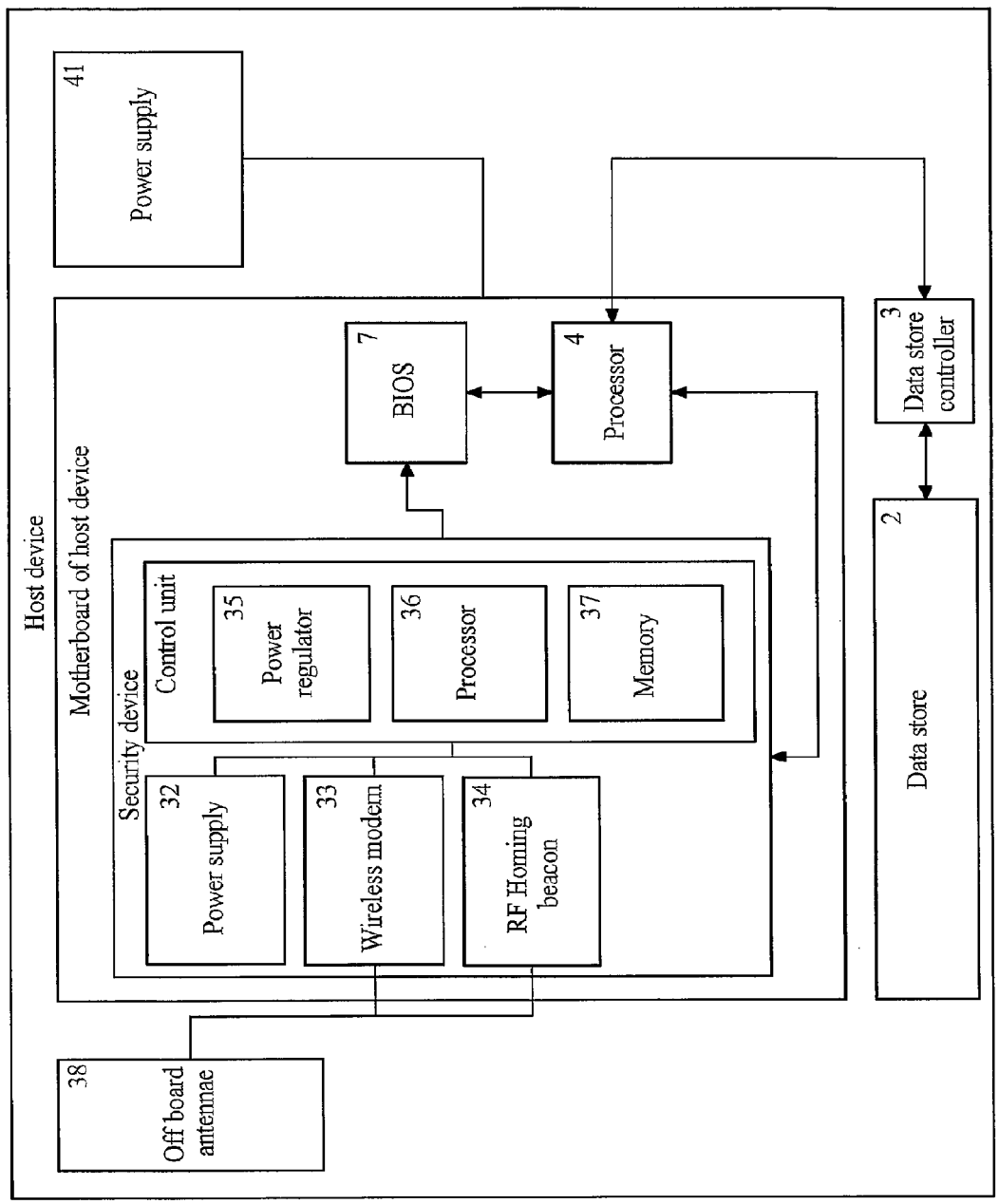
FIG. 13 shows a block diagram representation of a communications and security device incorporated in a motherboard of a host device.

Optionally each branch of the control diagram of FIG. 13 may be employed in a hierarchical fashion. Preferably a control sequence according to FIG. 13 may be modified in response to a power constraint.

Referring now to FIG. 13, an embodiment of the present invention which is a security and communications device incorporated into the motherboard 40 of a host device is shown.

In this embodiment a security device 31 is provided with an independent power supply 32 such that it may be operated when a host device is switched off. A security device has a power regulator 35, a processor 36 and a wireless modem 33. In these embodiments a security device has one or more antennae 38 operable to transmit and receive signals to or from communication systems 33, 34 of the security device 31.

In this embodiment a security device 31 integrated with a motherboard 40 of a host device has a radio frequency homing device 34. The radio frequency homing device may be activated in response to a received command message or in response to not receiving a command message. Optionally a radio frequency homing device 34 may be activated after a certain period during which a command message is not received. Command messages may be supplied in the form of encrypted SMS messages or by an authorised user of a host device 40.

Advantageously, in this embodiment the processor 36 is operable to control all aspects of the host device 1. This control extends to control over the power supply of the host device 41 such that the security device may switch on and control the host device in response to a receive command message. In addition, the BIOS of the host device is programmed to pass control of the boot sequence of the host over to the control unit of the security device. During this period, each time the host device switches on, the security device 31 has control of the host device 1 including its data storage 2 and data storage controller 3.

In a normal mode of operation during the boot up sequence the BIOS 7 passes control of the host 40 to the security device 31. The security device checks for any queued command messages and performs any actions required by these messages before passing control back to the host device 40 to complete the boot up sequence.

The processor 36 has a non-volatile memory not shown storing instructions to perform one or more of the following actions: to delete data from the data storage 2 of the host device 1; to disable the data storage controller 3 of the host device 1; to lock the BIOS 7 of the host device 1; to change the BIOS password of the host device 1; to delete a directory structure of the data storage 2; to overwrite a directory structure of the data storage 2; to modify data on the data storage 2; to delete nominated data from the data storage 2; to read data from the data storage 2; to transmit data from the data storage 2 of the host device to a remote device not shown; to encrypt data; to activate a radio homing device 12; or to perform any combination of the foregoing actions.

Received command messages need not carry detailed instructions for the security device to perform these actions and need only reference a memory address of the processor 36 or a look up table address in order to deliver a security command.

The processor has a non-volatile memory not shown storing instructions to perform one or more of the following actions: to delete data from the data storage of the host device; to disable the data storage controller of the host device; to lock the BIOS of the host device; to change the BIOS password of the host device; to delete a directory structure of the data storage; to overwrite a directory structure of the data storage; to modify data on the data storage; to delete nominated data from the data storage; to read data from the data storage; to transmit data from the data storage of the host device to a remote device not shown; to encrypt data; to activate a GPS device; to perform a GPS location measurement using the GPS device; to transmit GPS information; or to perform any combination of the foregoing actions.

Optionally, embodiments of this security device may have a record of authorised geographical locations, optionally in the form of a range of locations. In these embodiments further instructions may be stored in the non volatile memory of the processor which are operable to cause the processor to compare measured GPS location information with the range of authorised geographical locations and if the location information is not within a range of authorised geographical locations the processor may perform a responsive action. The responsive action may be chosen from one or more of the following: to delete data from the data storage of the host device; to disable the data storage controller of the host device; to lock the BIOS of the host device; to change the BIOS password of the host device; to delete a directory structure of the data storage; to overwrite a directory structure of the data storage; to modify data on the data storage; to delete nominated data from the data storage; to read data from the data storage; to transmit data from the data storage of the host device to a remote device not shown; to encrypt data; to activate a GPS device; to perform a GPS location measurement using the GPS device; to transmit GPS information; or to perform any combination of the foregoing actions.

In some other embodiments not shown a security device integrated with a motherboard of a host device has a radio frequency homing device and a GPS unit. Optionally in these embodiments a radio frequency homing device may be activated when a GPS unit senses that a device has left an authorised geographical area. Preferably in these embodiments a security device may take data security measures when a GPS unit senses that a device has left an authorised geographical area.

In an embodiment a security device integrated with a motherboard of a host device may be operable in response to a remote command. Optionally a remote command may be received using a secure channel of a wireless modem of a security device. Preferably SMS messages may be used to provide a secure channel, further preferably SMS messages of a secure communication channel are encrypted SMS messages.

Preferably in an embodiment a control unit of a security device is operable to control the BIOS of a host device. In some embodiments a BIOS of a host device may be controlled to prevent a host device from operating. In some embodiments a BIOS of a host device may be controlled to suspend a boot sequence of a host device. In these embodiments a data store controller of a host device may be induced to modify a data store of a host device before a boot sequence has completed. Optionally modifying a data store may comprise: deleting data; deleting a directory structure of a data store; overwriting data.

Preferably data modifications may be performed in hierarchical order, for example so that short duration actions can be performed first followed subsequently by longer duration actions. For example, a first security measure might be deleting a directory structure, a second security measure might be deleting nominated data, a third security measure might be overwriting nominated data, a fourth security measure might be deleting data, a fifth security action might be overwriting data. Other actions may be performed and actions may be performed in a different order. Preferably by this method data security can be optimally provided without intervention by an unauthorised party. Further preferably if an unauthorised party interferes with a sequence of data security measures at least one measure will have at least partially completed before an unauthorised party interferes with a data security measure.

Figure 14:
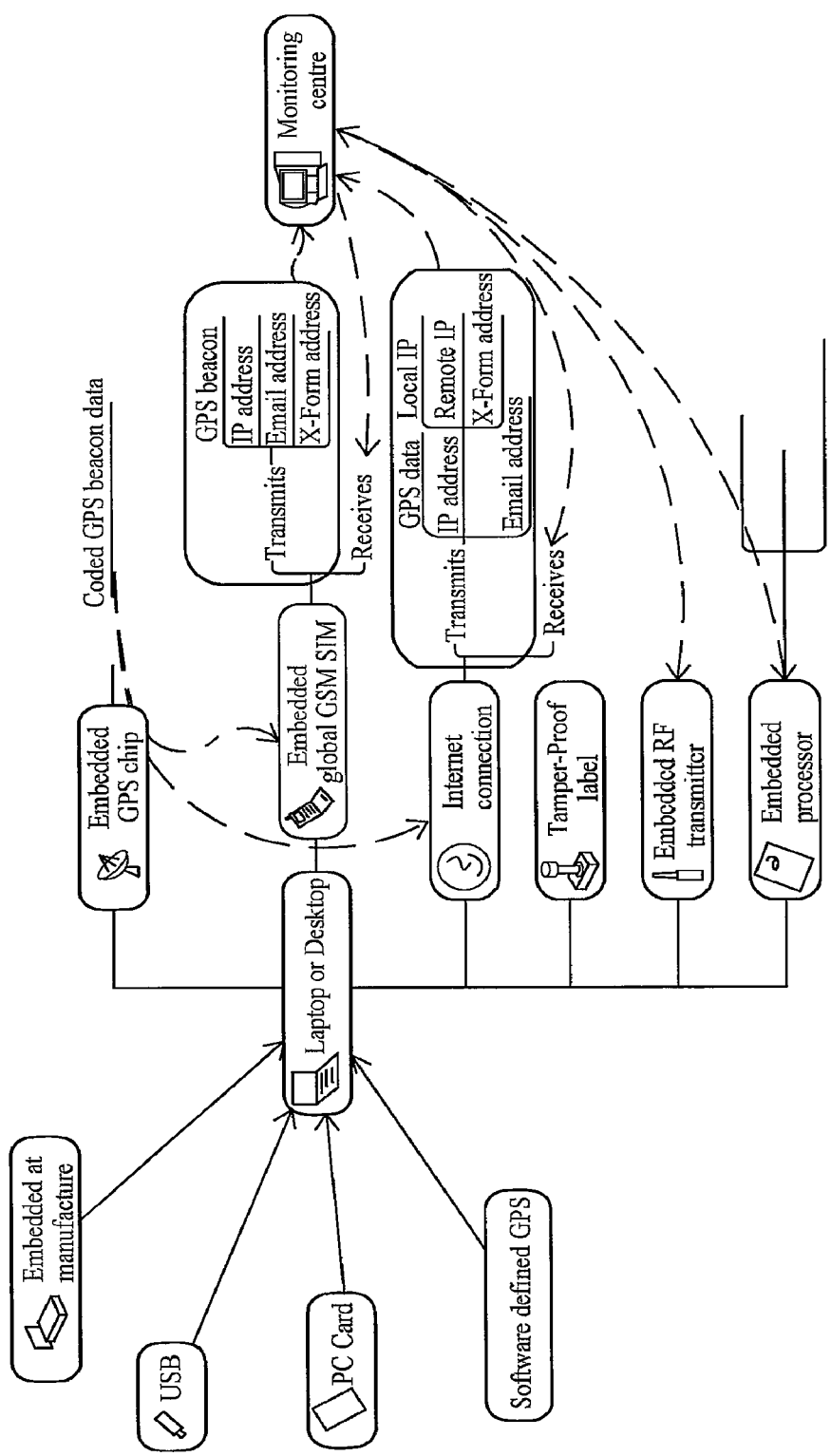
FIG. 14 shows a representational view of a scheme of operation of embodiments of the present invention.

Referring now to FIG. 14 a representation of a scheme of operation of embodiments of the present invention is shown.

Security measures provided by these embodiments may be substantially as described in other embodiments of the invention.

Individual features and methods of operation in the described embodiments are now described in detail.

Power Regulator

In some embodiments a power regulator is provided which distributes power to the components of the system.

A power regulator may have a number of modes of operation depending on power availability and power demand requirements.

A power regulator may supply power to components of a security device at intervals. Intervals may be regular intervals or may be determined by testing criteria. In embodiments intervals may be set by a remote command. In some embodiments a security device may adjust, override or ignore a remote command. Preferably, where a power availability is below a threshold, a security device may extend an interval to prolong operability of a security device.

Optionally a power regulator may maintain a GPS receiver in an on state. In other optional modes of operation a GPS receiver may be kept in a sleep state and fully turned on at intervals or in response to a received command.

In some embodiments, a time interval between uses of a GPS receiver is recorded. If a time interval between uses of a GPS receiver is below a threshold previous ephemeris data for some GPS satellites may be maintained. In these embodiments a power up duration of a GPS receiver may be reduced because these satellites can be used in position calculations as soon as their signals are found and the receiver does not need to listen to collect orbital data.

In some embodiments, during active monitoring of a security device a GPS receiver may be maintained in a powered state. Optionally a powered state may comprise a fully powered state or a partially powered stand-by state.

In a power saving mode the power regulator only supplies power to components of the system when the components may be operated effectively. For example, a GSM device may be supplied with power for a brief period during which it searches for a base station signal. If a base station signal is not found within a given interval the GSM device may be switched off to conserve power.

A power saving mode may be selected when a battery charge level drops below a pre-determined threshold. Alternatively a power saving mode may be selected by a user or a power saving mode might be a default mode.

More generally, to preserve battery life the power regulator may measure connectability parameters of communication and location determining systems. These systems may be kept in a power saving state, or switched off while they are unable to communicate.

Connectability parameters of the communication systems may be tested hierarchically to identify a usable communication channel.

Once a communication channel is found to be operative steps are taken to determine location and to transmit the determined location Coupled to the power regulator is a battery, preferably the power regulator is operable to draw power from a host device to recharge the battery. This may be achieved using an interface with the host device, such as PCMCIA or USB interfaces or any related or derivative interface.

A power regulator and battery arrangement may be parasitic. In this case the device may be operable to draw power from the host device battery even if host device is not turned on.

A battery may be any type of battery such as a rechargeable nickel cadmium battery, nickel metal hydride battery, a rechargeable alkaline battery or any other kind of rechargeable battery. Alternatively a battery may be a disposable battery or a fuel cell or a super-capacitor or any other kind of portable device for providing electrical energy.

Operation Mode Indicator

The security device and the host device may have a number of states including a normal operating state and a protected state.

In a protected state the security device may regularly report its location to a base station.

In a protected state the host device may not allow user interface devices to be used.

In a protected state the host device may regularly report its IP address when connected to the internet.

The device state may be recorded in an operation mode indicator on the device

Data Security Measures

A security device may be operable to delete data from a data store of a host device. Optionally a security device may be operable to delete a directory structure from a data store of a host device. In some embodiments a security device may be operable to overwrite a portion of a data store of a host device. In particular embodiments the portion of a data store selected to be deleted or overwritten may comprise sensitive data. Optionally in these embodiments an authorised used of a host device may be prompted to identify sensitive data which should be protected in this way.

In some embodiments all data on the host device is encrypted using encryption keys that are held only on the security device. To protect against cold boot attacks encryption keys may not be held in the volatile memory of a host device.

Preferably, to prevent man in the middle attacks on information passed from the security device to the host device communication between the devices is itself encrypted. This encryption may be implemented using a shared secret.

Other security measures may be implemented to protect the communication between the host device and the security device, for example a shared secret may be hashed with a time or date stamp to prevent an attacker from intercepting and replaying communication between the security device and the host device.

In some embodiments a security device has a tamper detection mechanism. Preferably detecting that an attempt has been made to tamper with a security device causes a host device to perform a responsive action. In some embodiments a responsive action may be deleting data from a data store of a host device.

Optionally data on the host device may be encrypted with a one time pad retained in the security device.

Optionally detecting that an attempt has been made to tamper with a security device causes a security device to delete an encryption key.

As a fall back the encryption key may itself protected by a deniable encryption method. In the event a tamper detection mechanism is overcome an unauthorised user attempting to obtain encryption or security information, or other information, from the security device key would have to overcome deniable encryption based on a shared secret.

In some embodiments the shared secret is derived from biometric data. In some embodiments the biometric data is fingerprint data derived from a finger print reader built in to the security device.

The security device may be arranged so that destructive interrogation of device necessarily destroys security information and any encryption keys stored on the device.

Optionally user determined criteria may be set which will cause a security device to perform a responsive action after a certain period without communication from a base station.

Optionally, user determined criteria may also be set to make the security device destroy data after a certain number of unauthorised attempts to start up the host device.

In some embodiments software provided for the host device creates periodic back ups of data stored on the host device data storage by relaying data to a remote data storage facility.

In other embodiments a security device keeps track of data back-up procedures. Optionally a security device may be operable to transmit data from a host device that was recorded since the most recent back up procedure. Optionally a security device may be operable to transmit data recorded recently. Preferably this data may be data recorded after a predetermined date. In some embodiments this date is provided in a command message received by a security device. In some embodiments a security device is operable to transmit data from a predetermined directory or file of a data store of a host device. In embodiments the directory or file may be specified in a command message.

Optionally, data transmitted by a security device may be encrypted.

Optionally a security device may be provided with an independent back up memory, in these embodiments a security device may record data from a host device and maintain it in a memory of a security device. In these embodiments a security device may be operable to transmit data held in a memory of a security device. Preferably data held in a security device may be data recorded in a host device during a given period. Further preferably data held in a memory of a security device may be data, or types of data, specified by a user. Preferably in these embodiments a security device is operable to transmit sensitive data whether or not a host device is powered up and to delete the data once it has been transmitted.

Optionally, data held in a back-up memory of a security device may be encrypted.

Preferably in an embodiment a control unit of a security device is operable to control the BIOS of a host device. In some embodiments a BIOS of a host device may be controlled to prevent a host device from operating. In some embodiments a BIOS of a host device may be controlled to suspend a boot sequence of a host device. In these embodiments a data store controller of a host device may be induced to modify a data store of a host device before a boot sequence has completed. Optionally modifying a data store may comprise: deleting data; deleting a directory structure of a data store; overwriting data.

Preferably data modifications may be performed in hierarchical order, for example so that short duration actions can be performed first followed subsequently by longer duration higher security actions. For example, a first security measure might be deleting a directory structure, a second security measure might be deleting nominated data, a third security measure might be overwriting nominated data, a fourth security measure might be deleting data, a fifth security action might be overwriting data. Preferably by this method data security can be optimally provided without intervention by an unauthorised party. Further preferably if an unauthorised party interferes with a sequence of data security measures at least one measure will have at least partially completed before an unauthorised party interferes with a data security measure.

Optionally a security device may use a webcam of a host device to acquire an image, preferably an image of an unauthorised user. Optionally a communication system of a security device may transmit image data acquired by a webcam of a host device.

Location Restriction

Leaving a certain geographical area without specific user authorisation may cause responsive action by security device. A responsive action may cause a host device to encrypt or overwrite the data store of a host device.

Optionally, specific user authorisation to leave an area may be provided to leave a certain geographical area. Preferably specific user authorisation maybe provided using biometric or password authorisation.

Location Reporting

Optionally, when a GPS signal is available the security device obtains location information from a GPS signal.

A security device may contain a position reporting mechanism which is capable of reporting its position regardless of the host product being turned on or off.

In embodiments an auxiliary location determining system may use GSM connections to determine location. This may be achieved by reporting identifiers and signal strengths of any GSM base stations a security device is able to connect to. This information is transmitted so that the information may be used to identify location.

In the absence of GPS signal or GPRS signal device may activate radio frequency homing beacon.

In some embodiments a security device may be provided with a wifi modem. In these embodiments if a security device is in range of an accessible wireless network it may use this network as an alternative communication channel.

Optionally, if either the security device or the host device connects to the internet software on the device silently reports its IP address/location. Connection may be by cellular modem, wifi modem, blue tooth, telephone call or SMS.

Optionally, if either device connects to a network when a security device is in a protected state code may be released onto the network to induce other devices to send out messages over the internet reporting the network's location.

Secure Communication Channel

In embodiments having a 3G GSM communication device a secure channel is provided for communication between a security device and a remote station.

Optionally in some embodiments SMS messages sent to and from the device may provide a secure channel for communication with a security device.

Preferably this provides a security device which need not rely on internet protocol based communications to provide security functions. Still more preferably using SMS messages to provide secure communications provides a communication channel where control messages may be queued while a security device is not contactable.

In some embodiments security information is sent to a security device in the form of SMS messages. Preferably these messages may be encrypted, further preferably the encryption may involve authentication of a sender.

In an embodiment SMS messages sent to the device may be filtered. Optionally filtering of SMS messages comprises only receiving messages from predetermined sources. In some embodiments the predetermined sources may include one or more sources chosen from the following list: an originating number corresponding to a monitoring station; a mobile telephone number corresponding to an authorised user of a device; a mobile telephone number or other originating number belonging to a predefined list of authorised numbers. Optionally a predefined list of authorised numbers may be a user configurable list.

In some embodiments a security device uses a communication channel to send location information. Optionally location information may be encrypted. Further optionally SMS messages may provide a secure communication channel.

In some embodiments encrypted location information is relayed directly to a police monitoring system. Optionally a monitoring system may be provided by an owner of a security device or another party.

Optionally the security device can be controlled remotely using any of the provided communication methods.

Preferably, security mechanisms may be activated remotely by GSM, GPRS, or radio frequency or internet messages.

Software for a Host Device

In an embodiment of the invention firmware modifications are provided for the basic input output system, BIOS, firmware of a host device. Preferably these modifications are performed at low level to prevent modification or alteration by a user. Further preferably other firmware or software provided with embodiments of the invention prevent BIOS flashing utilities being operated by the host device.

In some embodiments the BIOS of a host device performs checks when the device is powered up to ensure that correct hardware is connected to the host device. In embodiments of the invention the BIOS is modified to include a check that a security device is connected to the host device. Optionally the BIOS may prevent boot-up processes if a security device is not connected to the host device.

Further optionally a BIOS of a host device may verify that a security device is an authorised security device. In some embodiments a host device may verify a security device using a secure cryptoprocessor that can store secured information.

In some embodiments a security device may verify that a host device is an authorised host device. In some embodiments a security device may verify a host device using a secure cryptoprocessor that can store secured information.

In some embodiments a secure cryptoprocessor may be a trusted platform module, TPM, chip. In some embodiments a TPM chip is used to provide advanced security functions.

Preferably checks performed by a BIOS of the host device may include a check that a security communication channel of a security device is operational. Optionally the BIOS may prevent boot-up processes if a security communication channel of a security device is not operational.

Further preferably, checks performed by a BIOS of the host device may include a check to see if any command messages are queued to be processed by a processor of the security device. Optionally the BIOS may suspend system boot-up procedures until the suspension is ended by a processor of a security device.

During a suspension period queued commands may be processed by a processor of the security device. Preferably during suspension period the processor of a security device may control the host device. This control may include control of a hard disc of a host device, or a network connection of a host device. Optionally once a suspension period is ended control of a host device may be relinquished by a security device.

Software provided with embodiments of the present invention may perform BIOS modification such means that if device dismantled, and new hard disc installed software resident in a modified BIOS causes the processor to silently report its IP address when it is connected to the internet.

Optionally device drivers of the host device may be modified by the provided software to depend on components or information only found on the security device. In these embodiments a host device will not function without the security device in place.

Optionally firmware or device drivers of a host device are modified to encrypt all data using encryption keys stored on the security device. Preferably encryption keys never enter the volatile memory of the host device.

Optionally software installed on the host device when the device is configured removes certain essential components such as device drivers or firmware for components. These are replaced with instructions that cause the device to retrieve enabling instructions from the security device. As a result the host device becomes unusable without the security device.

In some embodiments a driver on the host device requires encryption information stored on device protection system.

In some embodiments a host device records an attempt to power up the host device without a security device. In response, optionally a host device records a time and date and may increment a counter. Preferably when a counter exceeds a predetermined threshold the host device powers up and deletes or overwrites data storage associated with the device.

Instructions to perform any or all of the methods of the above described embodiments may be provided in the form of computer program instructions. Instructions may be software or firmware. Computer program instructions may comprise a computer program product which may be recorded in a non-volatile data storage medium or may be encoded in hardware such as an ASIC or an FGPA or other hardware device. Preferably these instructions may be distributed over the internet or by wireless communication methods.

Clauses

Possibilities are described in the following numbered clauses.

1. A removable memory device having a housing and an interface for connection to a host device, the device comprising: an encryption processor and a data storage means, the encryption processor being coupled between the interface and the data storage means and being operable to perform cryptographic operations on data passed between the interface and the data storage means; and a wide area communication interface; and a location determining means; and a controller coupled to the location determining means and to the a communication means, wherein the controller is operable to control at least one of the encryption processor and the data storage means based on the location and/or an instruction received via the communication interface.

2. The removable memory device of clause 1 wherein the controller is operable to control at least one of the encryption processor and the data storage means to control access to stored data.

3. The removable memory device of clause 1 or 2 wherein the encryption processor encrypts all data stored in the data storage means.

4. The removable memory device of any preceding clause wherein the controller is operable to inhibit decryption operations of the encryption processor.

5. The removable memory device of clause 4 wherein the controller is operable to inhibit decryption operations of the encryption processor in response to a received command.

6. The removable memory device of clause 4 or 5 wherein the controller is operable to inhibit decryption operations of the encryption processor if it is determined that location information measured by the location determining means does not correspond to an authorised location.

7. The removable memory device of clause 4, 5 or 6 wherein the controller is operable to compare location information measured by the location determining means with a stored list of authorised locations.

8. The removable memory device of any of clauses 4 to 7 further operable: to transmit location information measured by the location determining means to a remote device; and to receive authorisation information from the remote device; and to at least one of inhibit and enable decryption operations of the encryption processor in dependence on the received authorisation information.

9. The removable memory device of clause 4 wherein the controller is operable to inhibit decryption operations of the encryption processor unless a host device provides security information.

10. The removable memory device of clause 9 wherein security information comprises a password.

11. The removable memory device of clause 9 or 10 wherein security information comprises biometric data.

12. The removable memory device of clause 11 wherein biometric data comprises fingerprint data.

13. The portable storage device of any preceding clause wherein the controller comprises a non-volatile memory storing instructions for performing security actions.

14. The portable storage device of clause 13 wherein a security action instructions are chosen from a list comprising instructions: to delete data from the data storage means; to disable the encryption processor; to change or delete an encryption key of the encryption processor; to delete a directory structure of the data storage means; to overwrite a directory structure of the data storage means; to modify data on the data storage means; to delete nominated data from the data storage means; to read and transmit data from the data storage to a remote device; to activate the location determining means; to perform a location measurement using the location determining means; to transmit location information; or to perform any combination of the foregoing actions.

15. The portable storage device of clause 13 or 14 operable to receive a secure message using the communication means wherein a secure message comprises a reference to a memory address of the non-volatile memory of the controller and wherein this memory address reference causes the controller to follow instructions associated with that memory address.

16. A data storage device having a housing and an interface for connecting the data storage device to a host device, the data storage device comprising: location determining means, data storage means, an encryption processor, and a controller, wherein the encryption processor is coupled to the interface and to the data storage means and is operable, under control of the controller, to perform encryption operations on data communicated between the interface and the data storage means; and
the controller is coupled to the location determining means and comprises a non-volatile memory for storage of permitted location information.

17. A data storage device according to clause 16 wherein the controller is operable to compare current location information with permitted location information to determine whether the current location corresponds to a permitted location.

18. A data storage device according to clause 17 wherein, in the event it is determined that the current location does not correspond to a permitted location, the controller is operable to inhibit the encryption processor from performing encryption operations.

19. A data storage device according to clause 16, 17 or 18 having energy storage means operable to provide power to components of the data storage device.

20. A data storage device according to clause 19 wherein the energy storage means is operable to store energy derived from a host device attached to the interface.

21. A data storage device according to any of clauses 16 to 20 wherein inhibiting encryption operations includes at least one of withholding an encryption key, deleting an encryption key, modifying an encryption algorithm, deleting an encryption algorithm, withholding an encryption enabling flag.

22. A secure data storage device having a housing and an interface for connecting the data storage device to a host device, the data storage device comprising: data storage means, communication means, an encryption processor for performing encryption operations on information passed between the data storage means and the host device, and a controller, wherein the controller is operable to disable the encryption processor.

23. The secure data storage device of clause 22 wherein the controller is operable to disable the encryption processor in the event that the data storage device is disconnected from a host device.

24. The secure data storage device of clause 22 or 23 wherein the communication means is operable to send and receive controller operation commands to at least one of: enable the encryption processor; disable the encryption processor; delete data from the data storage means; report the MAC address of the host device; report host device information to a remote device.

25. A secure data storage device having a housing and an interface for connecting the data storage device to a host device, the data storage device comprising: data storage means, communication means, an encryption processor for performing encryption operations on information passed between the data storage means and the host device, and a controller, wherein the controller comprises a volatile memory for the storage of encryption key information received from a remote device and wherein the controller is operable to provide encryption key information to the encryption processor and to overwrite encryption key information.

26. A secure data storage device according to clause 25 wherein encryption key information is not stored in the encryption processor.

27. A secure data storage device according to clause 26 wherein the controller is configured to overwrite encryption key information stored in the volatile memory in response to at least one of: removal of the data storage device from a host device, receiving a secure command from a remote device, not receiving a secure command from a remote device for a more than a specified interval, a command issued by a user of the device.

28. The removable memory device of any preceding clause wherein the communication interface is a cellular wireless device, preferably comprising one of: wireless network interface, a wireless internet protocol device, a GSM communicator, a GSM and/or a 3G modem.

29. The removable memory device of any preceding clause wherein the location determining means comprises at least one of a GPS receiver and a cellular wireless communicator.

30. A removable memory device according to any preceding clause wherein the interface is a USB interface or any derivative thereof.

31. The removable memory device of any preceding clause wherein the housing comprises a tamper prevention mechanism arranged such that tampering with the housing renders the data storage means inoperable.

32. The removable memory device of any preceding clause wherein the device is a USB memory stick.

33. The removable memory device of any preceding clause wherein the device is a removable hard disk.

34. The removable memory device of any preceding clause further comprising a rechargeable battery operable to power the communication means to send an alert message in the event of unauthorised use of the device.

35. A removable memory device substantially as herein described with reference to the accompanying drawings.

While the preferred embodiment of the invention has been illustrated and described in the drawings and foregoing description, the same is to be considered as illustrative and not restrictive in character, it being understood that all changes and modifications that come within the spirit of the invention are desired to be protected.

The invention claimed is:
1. A removable memory device comprising:
an interface for connecting the removable memory device to a host device;
a data storage coupled to the interface;
a wide area communication interface configured to receive a security message, the security message comprising a user data header and message data including a security command;
a controller coupled to the wide area communication interface, wherein the controller is configured to apply a physically damaging voltage to permanently disable the data storage in response to the security message received via the wide area communication interface;

wherein the wide area communication interface is configured to accept security messages only from at least one predetermined source; and wherein the controller is configured to identify the at least one predetermined source based on an identifier carried by the user data header.

2. The removable memory device of claim 1 comprising a location determiner coupled to the controller, wherein the controller is configured to transmit, over the wide area communication interface, location information determined by the location determiner to a specified device controlled by an authorised controller of the memory device, to be compared with a stored list of authorised locations, and to enable the controller to determine whether to permanently disable the data storage based on the comparison.

3. The removable memory device of claim 2 further comprising an encryption processor wherein the controller is configured to inhibit decryption operations of the encryption processor if it is determined that location information measured by the location determiner does not correspond to an authorised location.

4. The removable memory device of claim 2 wherein the removable memory device transmits location information measured by the location determiner to a remote device, and at least one of inhibits and enables decryption operations of the encryption processor in dependence upon authorisation information received from the remote device in response to said location information.

5. The removable memory device of claim 1, further comprising an encryption processor coupled between the data storage and the interface for connection to a host device.

6. The removable memory device of claim 5 wherein the controller is configured to control the encryption processor and the data storage to control access to data stored in the data storage.

7. The removable memory device of claim 6 wherein the controller is configured to inhibit decryption operations of the encryption processor unless a host device provides security information.

8. The removable memory device of claim 5 wherein the controller is configured to control the encryption processor based on a second security command received via the wide area communication interface.

9. The removable memory device of claim 5 wherein the controller is configured to inhibit decryption operations of the encryption processor.

10. The removable memory device of claim 1 wherein the controller comprises a non-volatile memory storing instructions for performing security actions of the removable memory device.

11. The removable memory device of claim 10 wherein the security action is chosen from a list comprising instructions: to delete data from the data storage means; to disable the encryption processor; to change or delete an encryption key of the encryption processor; to delete a directory structure of the data storage means; to overwrite a directory structure of the data storage means; to modify data on the data storage means; to delete nominated data from the data storage means; to read and transmit data from the data storage to a remote device; to activate the location determining means; to perform a location measurement using the location determining means; to transmit location information; or to perform any combination of the foregoing actions.

12. The removable memory device of claim 10 wherein the security command comprises a reference to a memory address of the non-volatile memory of the controller and the controller is configured to follow instructions associated with that memory address.

13. The removable memory device of claim 1 wherein the wide area communication interface comprises a cellular wireless device.

14. The removable memory device of claim 1 wherein permanently disabling the data storage comprises permanently destroying the data storage.

15. The device of claim 1 wherein the security message comprises an SMS message.

16. A method of securing a removable memory device, the method comprising:
communicating with the removable memory device via a wide area communication interface to control access to a data store of the removable memory device; and
receiving a security message from at least one predetermined source via the wide area communication interface, the security message comprising a user data header and message data comprising a security command to disable the removable memory device;
wherein the removable memory device accepts the security message from the at least one predetermined source based on an identifier carried by the user data header;
wherein the removable memory device is configured to apply a physically damaging voltage to the data store to permanently disable the data storage when the security command is received.

17. The method of claim 16 comprising receiving location information from the removable memory device, determining that the location information indicates that the removable memory device is not in an authorised location, and, prior to receiving the security command to permanently disable the removable memory device, sending a second security message including a second security command to the removable memory device via the wide area communication interface, the removable memory device configured to switch off access to the data store of the removable memory device.

18. The method of claim 16 further comprising, prior to receiving the security command to disable the removable memory device, controlling access to the data store of the removable memory device by sending a command to the removable memory device to at least one of: switch off access to the data store in the removable memory device and switch off a power supply to the data store of the removable memory device.

19. The method of claim 16, wherein the removable memory device is configured to reject security messages that do not originate from at least one predetermined source.

* * * * *